US012076841B2

(12) United States Patent
Ueda et al.

(10) Patent No.: US 12,076,841 B2
(45) Date of Patent: Sep. 3, 2024

(54) IMPACT TOOL, METHOD FOR CONTROLLING THE IMPACT TOOL, AND PROGRAM

(71) Applicant: Panasonic Intellectual Property Management Co., Ltd., Osaka (JP)

(72) Inventors: Takahiro Ueda, Okayama (JP); Takashi Kusagawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 50 days.

(21) Appl. No.: 18/016,993

(22) PCT Filed: May 17, 2021

(86) PCT No.: PCT/JP2021/018596
§ 371 (c)(1),
(2) Date: Jan. 19, 2023

(87) PCT Pub. No.: WO2022/024501
PCT Pub. Date: Feb. 3, 2022

(65) Prior Publication Data

US 2023/0311278 A1 Oct. 5, 2023

(30) Foreign Application Priority Data

Jul. 31, 2020 (JP) ................................ 2020-131107

(51) Int. Cl.
*B25B 21/02* (2006.01)
*B25B 23/147* (2006.01)
*B25F 5/00* (2006.01)

(52) U.S. Cl.
CPC .......... *B25B 21/02* (2013.01); *B25B 23/1475* (2013.01); *B25F 5/001* (2013.01)

(58) Field of Classification Search
CPC ...... B25B 21/02; B25B 23/1475; B25B 5/001
See application file for complete search history.

(56) References Cited

U.S. PATENT DOCUMENTS

2012/0234566 A1 9/2012 Mashiko et al.
2013/0126202 A1* 5/2013 Oomori .................. B25B 21/00 173/217

(Continued)

FOREIGN PATENT DOCUMENTS

JP H09-285974 A 11/1997
JP 2009-083045 A 4/2009

(Continued)

OTHER PUBLICATIONS

International Search Report dated Aug. 3, 2021 issued in International Patent Application No. PCT/JP2021/018596, with English translation.

*Primary Examiner* — Nathaniel C Chukwurah
(74) *Attorney, Agent, or Firm* — Rimon P.C.

(57) ABSTRACT

An impact tool includes a motor, an impact mechanism, an output shaft, a control unit, and an angular lead measurer. The impact mechanism includes a hammer and an anvil. The anvil rotates upon receiving impacting force from the hammer. The angular lead measurer measures an angular lead in rotation of the anvil over the hammer. The control unit changes, according to the angular lead measured by the angular lead measurer, a control mode for controlling the rotational velocity of the output shaft from one of a plurality of modes to another.

11 Claims, 11 Drawing Sheets

(56) References Cited

U.S. PATENT DOCUMENTS

| | | | | |
|---|---|---|---|---|
| 2015/0021062 | A1* | 1/2015 | Sekino | B25B 23/14<br>173/183 |
| 2017/0008156 | A1* | 1/2017 | Miyazaki | B25B 23/1475 |
| 2017/0246732 | A1* | 8/2017 | Dey, IV | B25B 23/1475 |
| 2019/0022837 | A1 | 1/2019 | Dey, IV et al. | |
| 2019/0118353 | A1 | 4/2019 | Woetzl et al. | |
| 2020/0171632 | A1 | 6/2020 | Dey, IV et al. | |
| 2020/0361064 | A1* | 11/2020 | Gaul | B25B 21/02 |

FOREIGN PATENT DOCUMENTS

| | | | |
|---|---|---|---|
| JP | 3155654 | U | 11/2009 |
| JP | 2012-139784 | A | 7/2012 |
| JP | 2018-089705 | A | 6/2018 |
| JP | 2019-013990 | A | 1/2019 |
| JP | 2019-509182 | A | 4/2019 |
| JP | 2019-147239 | A | 9/2019 |
| WO | 2017/147437 | A1 | 8/2017 |
| WO | 2018/100802 | A1 | 6/2018 |
| WO | 2019/008858 | A1 | 1/2019 |

* cited by examiner

IMPACT TOOL, METHOD FOR CONTROLLING THE IMPACT TOOL, AND PROGRAM

CROSS-REFERENCE OF RELATED APPLICATIONS

This application is the U.S. National Phase under 35 U.S.C. § 371 of International Patent Application No. PCT/JP2021/018596, filed on May 17, 2021, which in turn claims the benefit of Japanese Patent Application No. 2020-131107, filed on Jul. 31, 2020, the entire disclosures of which Applications are incorporated by reference herein.

TECHNICAL FIELD

The present disclosure generally relates to an impact tool, a method for controlling the impact tool, and a program. More particularly, the present disclosure relates to an impact tool including an anvil that rotates upon receiving impacting force from a hammer, a method for controlling such an impact tool, and a program.

BACKGROUND ART

Patent Literature 1 discloses an impact rotary tool (impact tool) including a motor, a hammer, an output shaft, an impact detector, and a setting input unit. The hammer is rotated by the motor. Impact is applied from the hammer to the output shaft so that rotational force is applied to the output shaft. The impact detector detects the impact applied by the hammer on finding an impact decision value for use in impact detection greater than a threshold value. The output of the motor and a detection threshold value for use in the impact detector are switched according to setting torque entered through the setting input unit.

The worker who uses the impact tool of Patent Literature 1 is sometimes required, depending on the working situation, to operate the impact tool to turn the output shaft at an appropriate rotational velocity. That is to say, the worker needs to have skills to have such a delicate operation done.

CITATION LIST

Patent Literature

Patent Literature 1: JP 2009-083045 A

SUMMARY OF INVENTION

In view of the foregoing background, it is therefore an object of the present disclosure to provide an impact tool, a method for controlling the impact tool, and a program, all of which are configured or designed to control the rotational velocity of the output shaft autonomously according to the working situation.

An impact tool according to an aspect of the present disclosure includes a motor, an impact mechanism, an output shaft, a control unit, and an angular lead measurer. The impact mechanism includes a hammer and an anvil. The hammer rotates with motive power supplied from the motor. The anvil rotates upon receiving impacting force from the hammer. The output shaft rotates along with the anvil. The control unit controls a rotational velocity of the output shaft. The angular lead measurer measures an angular lead in rotation of the anvil over the hammer. The impact mechanism performs an impact operation when a torque condition on magnitude of torque applied to the output shaft is satisfied. The impact operation is an operation of applying the impacting force from the hammer to the anvil. The control unit changes, according to the angular lead measured by the angular lead measurer, a control mode for controlling the rotational velocity of the output shaft from one of a plurality of modes to another.

A control method for controlling an impact tool according to another aspect of the present disclosure is a method for controlling an impact tool including a motor, an impact mechanism, and an output shaft. The impact mechanism includes a hammer and an anvil. The hammer rotates with motive power supplied from the motor. The anvil rotates upon receiving impacting force from the hammer. The output shaft rotates along with the anvil. The control method includes a control step and an angular lead measuring step. The control step includes controlling a rotational velocity of the output shaft. The angular lead measuring step includes measuring an angular lead in rotation of the anvil over the hammer. The impact mechanism performs an impact operation when a torque condition on magnitude of torque applied to the output shaft is satisfied. The impact operation is an operation of applying the impacting force from the hammer to the anvil. The control step includes changing, according to the angular lead measured in the angular lead measuring step, a control mode for controlling the rotational velocity of the output shaft from one of a plurality of modes to another.

A program according to still another aspect of the present disclosure is designed to cause one or more processors to perform the control method described above.

DESCRIPTION OF EMBODIMENTS

Embodiment

Figure 1:
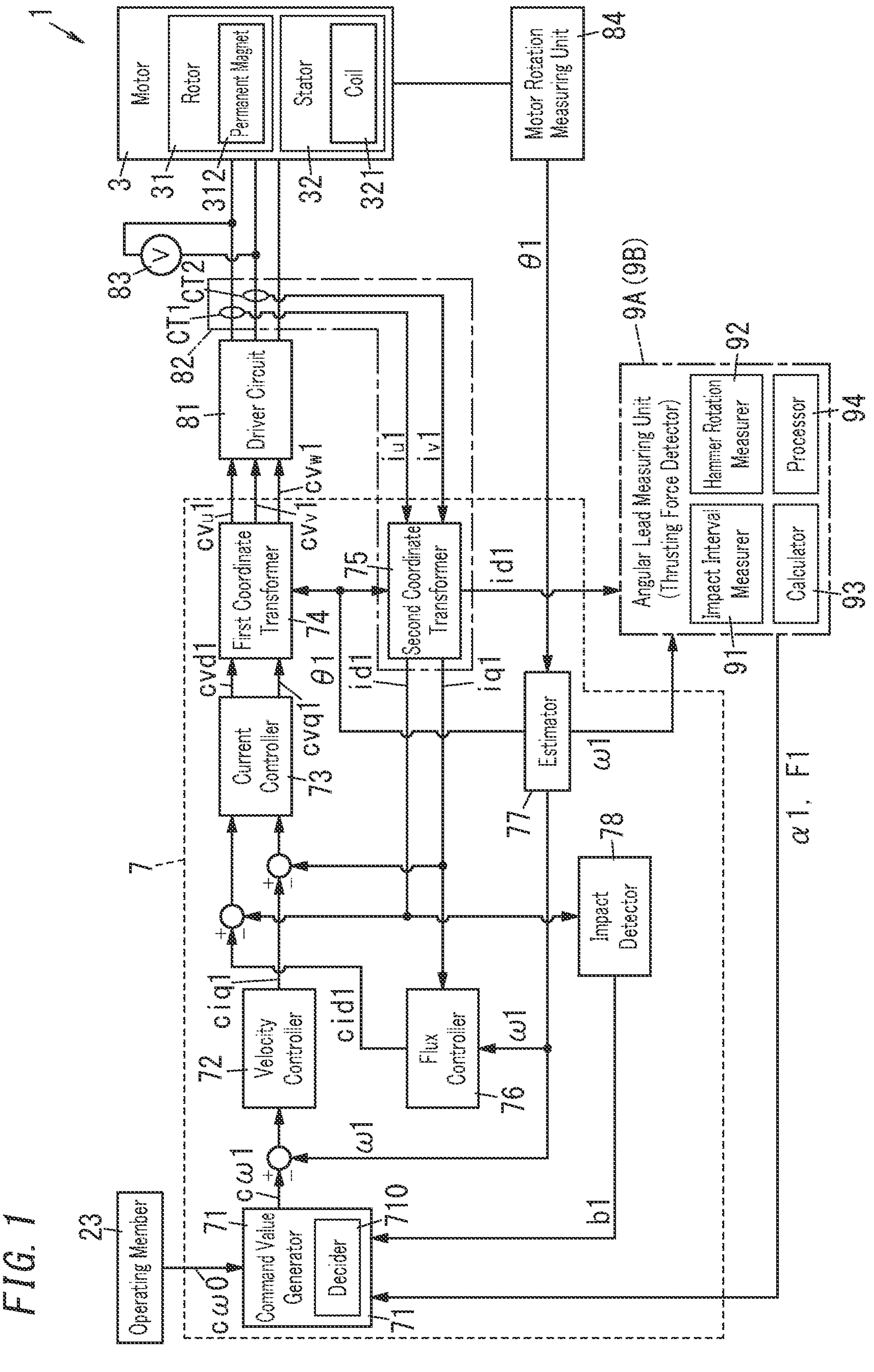
FIG. 1 is a control block diagram of an impact tool according to an exemplary embodiment.

Embodiments of an impact tool 1 will now be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are schematic representations. That is to say, the ratio of the dimensions (including thicknesses) of respective constituent elements illustrated on the drawings does not always reflect their actual dimensional ratio.

(1) Overview (1-1) Basic Configuration

As shown in FIGS. 1-4, an impact tool 1 according to an exemplary embodiment includes a motor 3, an impact mechanism 40, an output shaft 61, and a control unit 7. The impact mechanism 40 includes a hammer 42 and an anvil 45. The hammer 42 rotates with motive power supplied from the motor 3. The anvil 45 rotates upon receiving impacting force from the hammer 42. The output shaft 61 rotates along with the anvil 45. The impact mechanism 40 performs an impact operation when a torque condition on the magnitude of torque applied to the output shaft 61 is satisfied. The impact operation is an operation of applying the impacting force from the hammer 42 to the anvil 45.

The impact tool 1 has not only this configuration but also a configuration having at least a first feature, among the first, second, and third features to be described below. More specifically, the impact tool 1 has a configuration having all of the first, second, and third features to be described below.

(1-2) First Feature

The control unit 7 controls the rotational velocity of the output shaft 61. The impact tool 1 further includes an angular lead measurer 9A (refer to FIG. 1). The angular lead measurer 9A measures an angular lead in rotation of the anvil 45 over the hammer 42. The control unit 7 changes, according to the angular lead measured by the angular lead measurer 9A, a control mode for controlling the rotational velocity of the output shaft 61 from one of a plurality of modes to another.

A configuration having this first feature enables the impact tool 1 to control the rotational velocity of the output shaft 61 autonomously according to the working situation. For example, a state where the angular lead is small when a screw is fastened using the impact tool 1 corresponds to a state where the screw has been fastened rather tightly by the impact tool 1. In that case, the control mode of the control unit 7 is a second control mode (to be described later) among the plurality of control modes. In the second control mode, the control unit 7 reduces an increase in load by reducing the rotational velocity of the output shaft 61 (or stopping rotation of the output shaft 61) depending on a condition to prevent an excessive load from being applied to the output shaft 61 by fastening. This enables stabilizing the work using the impact tool 1.

(1-3) Second Feature

The control unit 7 controls the rotational velocity of the output shaft 61. The impact tool 1 further includes a thrusting force detector 9B (refer to FIG. 1). The thrusting force detector 9B detects thrusting force F1 applied to the output shaft 61. As used herein, the "thrusting force F1" refers to the force applied in a thrusting direction defined for the output shaft 61. The control unit 7 performs restriction processing when a thrusting force condition on the thrusting force F1 detected by the thrusting force detector 9B is satisfied. The restriction processing includes at least one of reducing the rotational velocity of the output shaft 61 or stopping rotation of the output shaft 61.

A configuration having this second feature enables the impact tool 1 to control the rotational velocity of the output shaft 61 autonomously according to the working situation. For example, if the thrusting force F1 has become excessive, then the impact tool 1 reduces the rotational velocity of the output shaft 61 (or stops the rotation of the output shaft 61) by performing the restriction processing, thereby reducing an increase in the thrusting force F1. This enables stabilizing the work using the impact tool 1.

(1-4) Third Feature

The control unit 7 performs a come-out reduction control when a first predetermined condition is satisfied and also performs stabilization control when a second predetermined condition is satisfied. As used herein, the "come-out reduction control" refers to a control for reducing the chances of causing come out, which is a phenomenon that a tip tool 62 coupled to the output shaft 61 and a screw 63, which is a work target for the tip tool 62, are disengaged from each other unintentionally while the motor 3 is running. On the other hand, the stabilization control as used herein refers to a control for reducing an unstable behavior of the hammer 42.

A configuration having this third feature enables the impact tool 1 to perform an autonomous control according to the working situation. For example, if the screw 63 as a work target is a wood screw and therefore there is a concern about the occurrence of the come-out phenomenon, then the impact tool 1 may perform the come-out reduction control. On the other hand, if the screw 63 as a work target is either a bolt or a hex lobe screw which has been fastened relatively tightly, and therefore, there is a concern that the hammer 42 might have an unstable behavior, then the impact tool 1 may perform the stabilization control. This enables stabilizing the work using the impact tool 1.

(2) Structure

Next, an impact tool 1 according to this embodiment will be described in detail. First, the structure of the impact tool 1 will be described.

In the following description, the direction in which a drive shaft 41 (to be described later) and the output shaft 61 are arranged side by side will be defined as a "forward/backward direction," the output shaft 61 is regarded as being located forward of the drive shaft 41, and the drive shaft 41 is regarded as being located backward of the output shaft 61. Also, in the following description, a direction in which a barrel 21 and a grip 22 (to be described later) are arranged one on top of the other will be defined as an "upward/downward direction," the barrel 21 is regarded as being located over the grip 22, and the grip 22 is regarded as being located under the barrel 21. Note that these definitions are only examples and should not be construed as specifying the direction in which the impact tool 1 should be used.

Figure 2:
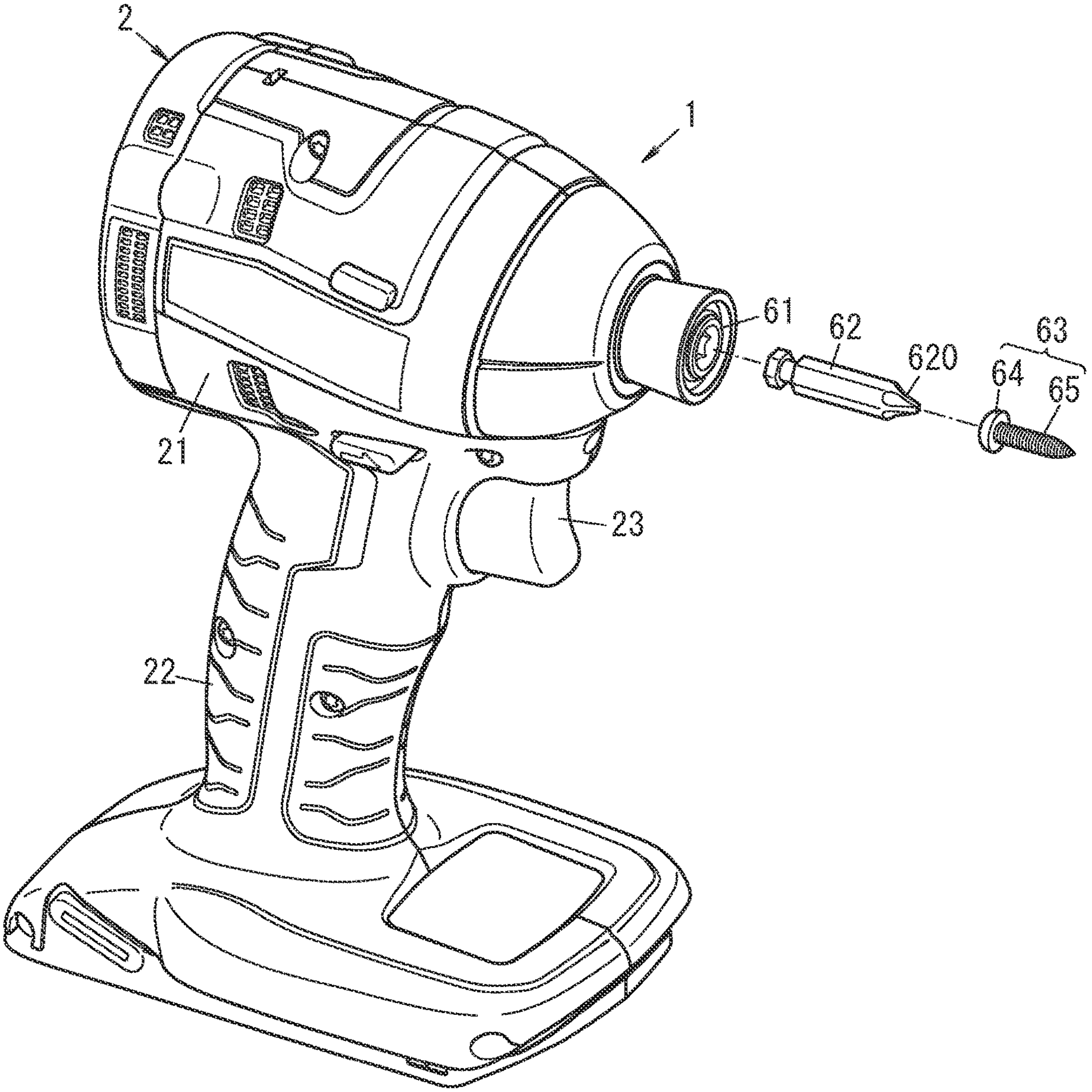
FIG. 2 is a perspective view of the impact tool.
Figure 3:
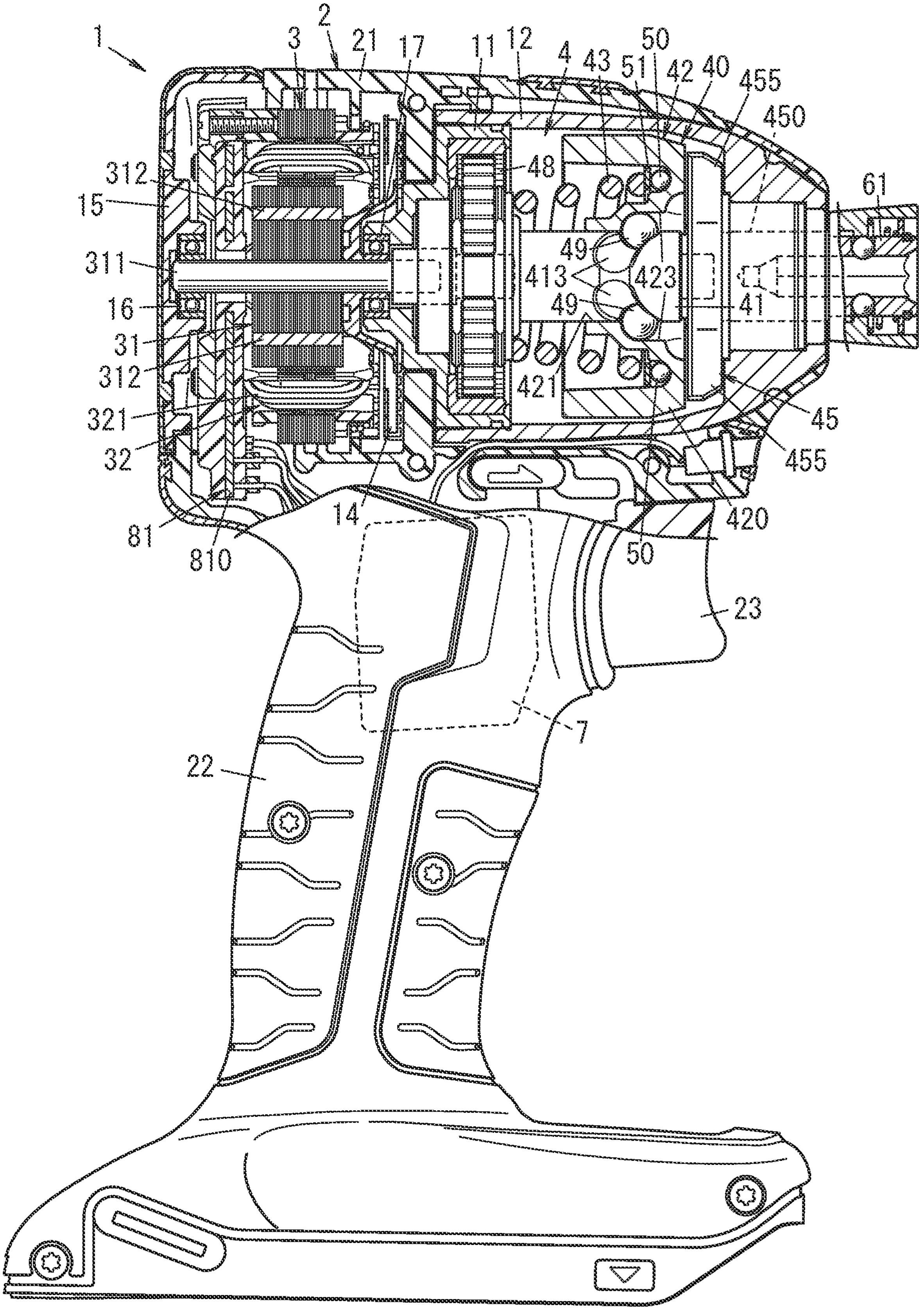
FIG. 3 is a side sectional view of the impact tool.

The impact tool 1 according to this embodiment is a portable electric tool. As shown in FIGS. 2 and 3, the impact tool 1 includes a housing 2, a motor 3, a transmission mechanism 4, the output shaft 61, an operating member 23, and the control unit 7.

The housing 2 houses the motor 3, the transmission mechanism 4, the control unit 7, and a part of the output shaft 61. The housing 2 includes the barrel 21 and the grip 22. The barrel 21 has a circular cylindrical shape. The grip 22 protrudes from the barrel 21. More specifically, the grip 22 protrudes from a side surface of the barrel 21.

The operating member 23 protrudes from the grip 22. The operating member 23 accepts an operating command for controlling the rotation of the motor 3. Note that the "rotation of the motor 3" as used herein refers to the rotation of a rotary shaft 311 of the motor 3. The ON/OFF states of the motor 3 may be switched by pulling the operating member 23. In addition, the rotational velocity of the motor 3 is adjustable by a manipulative variable indicating how deep the operating member 23 has been pulled. Specifically, the greater the manipulative variable is, the higher the rotational velocity of the motor 3 becomes. The control unit 7 starts or stops turning the motor 3, and controls the rotational velocity of the motor 3, according to the manipulative variable indicating how deep the operating member 23 has been pulled.

The tip tool 62 is coupled to the output shaft 61. More specifically, the tip tool 62 is attachable to, and removable from, the output shaft 61. The output shaft 61 rotates along with the tip tool 62 upon receiving the rotational force from the motor 3. Controlling the rotational velocity of the motor 3 by operating the operating member 23 allows the rotational velocity of the tip tool 62 to be controlled as well.

In this embodiment, the tip tool 62 is not a constituent element of the impact tool 1. However, this is only an example and should not be construed as limiting. Alternatively, the impact tool 1 may include the tip tool 62 as a constituent element thereof.

The tip tool 62 may be a screwdriver bit, for example. More specifically, the tip tool 62 according to this embodiment is a plus screwdriver bit, of which a tip portion 620 is formed in a + (plus) shape. The tip tool 62 is fitted into a screw 63 (such as a bolt or a "vis" screw) as a work target. Turning the tip tool 62 that is fitted into the screw 63 allows the work of tightening or loosening the screw 63 to be done.

The screw 63 includes a head portion 64 and a thread portion 65. The head portion 64 has a disklike shape. The thread portion 65 protrudes from the head portion 64. The head portion 64 has a plus (+) screw hole 640 (refer to FIG. 5). As used herein, the expression "the tip tool 62 and the screw 63 are fitted into each other" refers to a state where at least a part of the tip portion 620 of the tip tool 62 is inserted into the screw hole 640 of the screw 63. Meanwhile, the phenomenon that the tip tool 62 and the screw 63 are disengaged from each other (i.e., the come-out phenomenon) herein refers to the disengagement of the tip portion 620 of the tip tool 62 out of the screw hole 640 in a state where the tip tool 62 and the screw 63 are fitted into each other while the motor 3 is running (i.e., turning).

A rechargeable battery pack is attached removably to the impact tool 1. The impact tool 1 is powered by the battery pack as a power supply. That is to say, the battery pack is a power supply that supplies a current for driving the motor 3. In this embodiment, the battery pack is not a constituent element of the impact tool 1. However, this is only an example and should not be construed as limiting. Alternatively, the impact tool 1 may include the battery pack as a constituent element thereof. The battery pack includes an assembled battery formed by connecting a plurality of secondary batteries (such as lithium-ion batteries) in series and a case that houses the assembled battery therein.

The motor 3 may be a brushless motor, for example. In particular, the motor 3 according to this embodiment is a synchronous motor. More specifically, the motor 3 may be a permanent magnet synchronous motor (PMSM). The motor 3 includes: a rotor 31 having the rotary shaft 311 and a permanent magnet 312; and a stator 32 having a coil 321. The rotor 31 is caused to rotate with respect to the stator 32 by electromagnetic interaction between the permanent magnet 312 and the coil 321.

Also, the motor 3 is a servomotor. The torque and rotational velocity of the motor 3 vary under the control of the control unit 7 (which is a servo driver). More specifically, the control unit 7 controls the operation of the motor 3 by feedback control for bringing the torque and rotational velocity of the motor 3 closer toward target values. For example, the control unit 7 may perform a vector control. The vector control is a type of motor control method in which a current supplied to the motor 3 is broken down into a current component that generates torque (rotational force) and a current component that generates a magnetic flux and in which these current components are controlled independently of each other.

The transmission mechanism 4 includes the impact mechanism 40. The impact tool 1 according to this embodiment is an electric impact screwdriver for fastening a screw while performing an impact operation using the impact mechanism 40. The impact mechanism 40 generates impacting force based on the motive power supplied from the motor 3 and applies the impacting force to the tip tool 62 while performing the impact operation.

The transmission mechanism 4 includes not only the impact mechanism 40 but also a planetary gear mechanism 48. The impact mechanism 40 includes the drive shaft 41, the hammer 42, a return spring 43, the anvil 45, and two steel spheres 49. The rotational force of the rotary shaft 311 of the motor 3 is transmitted to the drive shaft 41 via the planetary gear mechanism 48. The transmission mechanism 4 transmits the torque of the motor 3 to the output shaft 61 via the drive shaft 41. The drive shaft 41 is interposed between the motor 3 and the output shaft 61.

The control unit 7 may change the rotational velocity of the output shaft 61 by changing at least one of the rotational velocity of the motor 3 or a gear ratio of the planetary gear mechanism 48. The control unit 7 may change the rotational velocity of the motor 3 by changing the electrical power supplied to the motor 3, for example. In addition, the control unit 7 may also change gears by driving an actuator and thereby sliding one of the gears of the planetary gear mechanism 48, for example. When the gears are changed, the gear ratio of the planetary gear mechanism 48 changes. In this embodiment, the control unit 7 performs the control of changing the rotational velocity of the motor 3 without controlling the gear ratio of the planetary gear mechanism 48.

Figure 4:
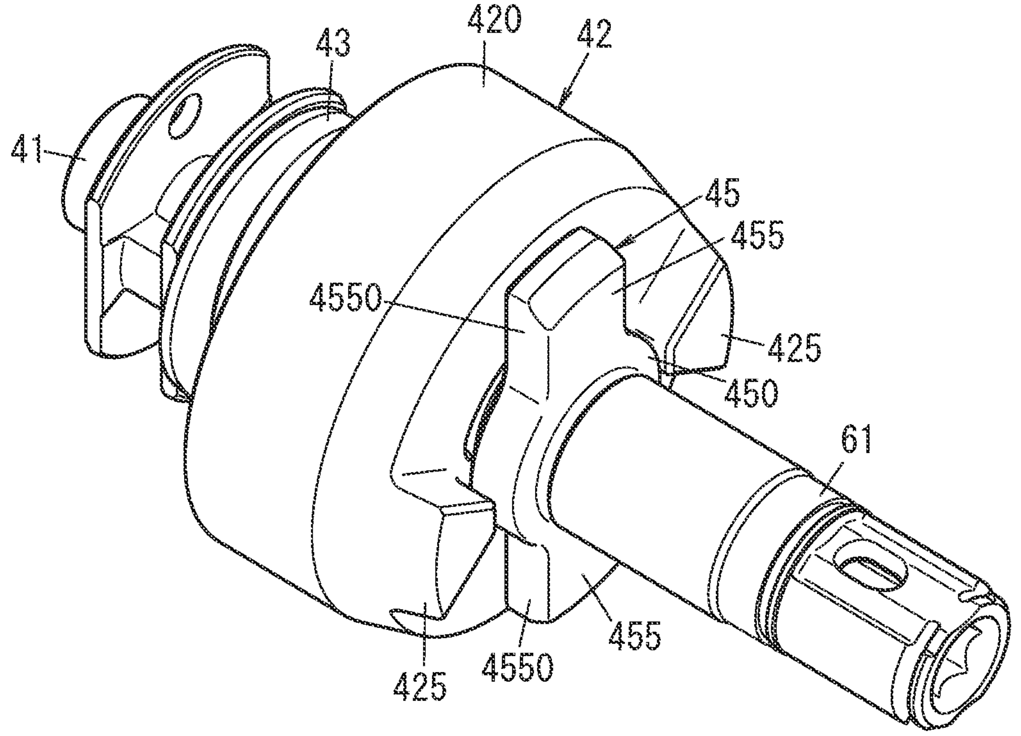
FIG. 4 is a perspective view of a main part of the impact tool.

The hammer 42 moves relative to the anvil 45 and applies impacting force to the anvil 45 upon receiving motive power from the motor 3. As shown in FIGS. 3 and 4, the hammer 42 includes a hammer body 420 and two projections 425. The two projections 425 protrude from a surface, facing the output shaft 61, of the hammer body 420. The hammer body 420 has a through hole 421 to pass the drive shaft 41 therethrough.

The hammer body 420 has two grooves 423 on an inner peripheral surface of the through hole 421. The drive shaft 41 has two grooves 413 on an outer peripheral surface thereof. The two grooves 413 are connected to each other. The two steel spheres 49 are sandwiched between the two grooves 423 and two grooves 413. The two grooves 423, the two grooves 413, and the two steel spheres 49 together form a cam mechanism. The cam mechanism allows, while the two steel spheres 49 are rolling, the hammer 42 to move along the axis of the drive shaft 41 with respect to the drive shaft 41 and rotate with respect to the drive shaft 41. As the hammer 42 moves along the axis of the drive shaft 41 either toward, or away from, the output shaft 61, the hammer 42 rotates with respect to the drive shaft 41.

The anvil 45 is formed integrally with the output shaft 61. The anvil 45 rotates along with the output shaft 61. The anvil 45 includes an anvil body 450 and two claws 455. The anvil body 450 has an annular shape. The two claws 455 protrude from the anvil body 450 along the radius of the anvil body 450. The anvil 45 faces the hammer body 420 along the axis of the drive shaft 41.

Also, while the impact mechanism 40 is not performing the impact operation, the hammer 42 and the anvil 45 rotate together with the two projections 425 of the hammer 42 kept in contact with the two claws 455 of the anvil 45 in the direction in which the drive shaft 41 turns. Thus, at this time, the drive shaft 41, the hammer 42, the anvil 45, and the output shaft 61 rotate along with each other.

The return spring 43 is interposed between the hammer 42 and the planetary gear mechanism 48. The return spring 43 according to this embodiment is a conical coil spring. The impact mechanism 40 further includes a plurality of (e.g., two in the example illustrated in FIG. 3) steel spheres 50 and a ring 51 which are interposed between the hammer 42 and the return spring 43. This allows the hammer 42 to rotate with respect to the return spring 43. The hammer 42 receives, from the return spring 43, biasing force applied along the axis of the drive shaft 41 toward the output shaft 61.

In the following description, the movement of the hammer 42 along the axis of the drive shaft 41 toward the output shaft 61 will be hereinafter referred to as "advancement of the hammer 42." Also, in the following description, the movement of the hammer 42 along the axis of the drive shaft 41 away from the output shaft 61 will be hereinafter referred to as "retreat of the hammer 42." Furthermore, in the following description, the movement of the hammer 42 to a position most distant from the anvil 45 within its movable range will be hereinafter referred to as a "maximum retreat." In this embodiment, an unstable behavior of the hammer 42 to be reduced by the stabilization control is a behavior of the hammer 42 that goes a predetermined distance or more away from the anvil 45 (i.e., a retreat behavior). More specifically, the unstable behavior of the hammer 42 to be reduced by the stabilization control is the maximum retreat, which is one type of retreat behavior. The maximum retreat may occur, for example, when the magnitude of the load applied to the output shaft 61 increases steeply.

When a torque condition on the magnitude of torque applied to the output shaft 61 (hereinafter referred to as "load torque") is satisfied, the impact mechanism 40 starts performing an impact operation. As used herein, the "impact operation" refers to an operation of applying impacting force from the hammer 42 to the anvil 45. In this embodiment, the torque condition is that the load torque be equal to or greater than a predetermined value. Specifically, as the load torque increases, the proportion of a force component having a direction that causes the hammer 42 to retreat increases with respect to the force generated between the hammer 42 and the anvil 45. When the load torque increases to the predetermined value or more, the hammer 42 retreats while compressing the return spring 43. In addition, as the hammer 42 retreats, the hammer 42 rotates while the two projections 425 of the hammer 42 are going over the two claws 455 of the anvil 45. Thereafter, the hammer 42 advances upon receiving recovery force from the return spring 43. Then, when the drive shaft 41 goes approximately half around, the two projections 425 of the hammer 42 collide against the respective side surfaces 4550 of the two claws 455 of the anvil 45. In this impact mechanism 40, every time the drive shaft 41 goes approximately half around, the two projections 425 of the hammer 42 collide against the two claws 455 of the anvil 45. That is to say, every time the drive shaft 41 goes approximately half around, the hammer 42 applies impacting force (rotational impacting force) to the anvil 45.

As can be seen, in this impact mechanism 40, collisions between the hammer 42 and the anvil 45 occur repeatedly. The torque caused by these collisions allows the screw 63 to be fastened more tightly than in a situation where no collisions occur between the hammer 42 and the anvil 45.

In the impact tool 1, the "come-out" phenomenon sometimes occurs, as described above. A first exemplary mechanism of causing the come-out phenomenon will be described. For example, when the rotational velocity of the motor 3 is unstable while the impact mechanism 40 is performing the impact operation, the hammer 42 may advance to reach the front end of its movable range, thus sometimes causing an instantaneous increase in the thrusting force applied from the tip tool 62 to the screw 63. Thereafter, the reaction of the screw 63 toward the tip tool 62 may bring the tip tool 62 out of engagement with the screw 63 to cause the come-out phenomenon. That is to say, the recoil of the tip tool 62 from the screw 63 may force the tip tool 62 to come out of the screw 63 to cause the come-out phenomenon.

Next, a second exemplary mechanism of causing the come-out phenomenon to the impact tool 1 will be described. The screw hole 640 (refer to FIG. 5) of the screw 63 has a tapered surface 641. When force is applied from the tip tool 62 to the tapered surface 641 in a direction intersecting with the axis of the screw 63, the tip tool 62 may come out of the screw hole 640 along the tapered surface 641 (i.e., the come-out phenomenon may occur). For example, if the tip tool 62 is oriented obliquely with respect to the screw 63, then a force component in the direction intersecting with the axis of the screw 63 becomes relatively large with respect to the force applied from the tip tool 62 to the tapered surface 641, thus increasing the chances of causing the come-out phenomenon by this second exemplary mechanism.

Also, the higher the rotational velocity of the motor 3 is, the more likely the force applied from the tip tool 62 to the tapered surface 641 increases, thus increasing the chances of causing the come-out phenomenon by this second exemplary mechanism. Furthermore, if the worker is pressing the tip tool 62 against the screw 63 with sufficient thrusting force along the axis of the screw 63, then the chances of causing the come-out phenomenon by the first or second exemplary mechanism are slim. However, if this thrusting force is insufficient, the come-out phenomenon may sometimes occur.

As shown in FIG. 3, the impact tool 1 further includes a holding base 11, a housing member 12, a driver circuit 81, a fan 14, a cover 15, a bearing 16, and another bearing 17. These members are all housed in the housing 2.

The holding base 11 has the shape of a bottomed circular cylinder. The holding base 11 holds the planetary gear mechanism 48 inside. That is to say, the holding base 11 holds the gears of the planetary gear mechanism 48 rotatably. In addition, the holding base 11 also holds the bearing 17. The bearing 17 held by the holding base 11 and the bearing 16 held by the cover 15 hold the rotary shaft 311 of the motor 3 rotatably. That is to say, the holding base 11 holds the rotary shaft 311 rotatably via the bearing 17. The rotary shaft 311 of the motor 3 is inserted into a through hole provided through a bottom surface of the holding base 11 and coupled to the planetary gear mechanism 48.

The housing member 12 has a circular cylindrical shape. The diameter of the housing member 12 decrease as the distance to the front end thereof decreases. The housing member 12 houses the transmission mechanism 4 therein. The holding base 11 is arranged to close the opening at one end (i.e., rear end in this case) of the housing member 12.

The driver circuit 81 is disposed behind the motor 3. The driver circuit 81 includes a board 810 and a plurality of power elements, which may be field effect transistors (FETs), for example.

The control unit 7 controls the motor 3 via the driver circuit 81. That is to say, the control unit 7 controls the power to be supplied to the motor 3 via the plurality of FETs of the driver circuit 81 by turning ON and OFF the plurality of FETs.

The fan 14 is coupled to the rotary shaft 311 of the motor 3. The fan 14 is disposed between the motor 3 and the holding base 11. The fan 14 produces air to flow forward. This allows the fan 14 to cool the internal space of the housing 2.

The cover 15 is disposed behind the driver circuit 81. The cover 15 covers the driver circuit 81.

(3) Control Unit

The control unit 7 includes a computer system including one or more processors and a memory. At least some functions of the control unit 7 are performed by making the one or more processors of the computer system execute a program stored in the memory of the computer system. The program may be stored in the memory. The program may also be downloaded via a telecommunications line such as the Internet or distributed after having been stored in a non-transitory storage medium such as a memory card.

As shown in FIG. 1, the control unit 7 includes a command value generator 71, a velocity controller 72, a current controller 73, a first coordinate transformer 74, a second coordinate transformer 75, a flux controller 76, an estimator 77, and an impact detector 78. Note that these constituent elements do not necessarily have substantive configurations but just represent respective functions to be performed by the control unit 7. Thus, these constituent elements of the control unit 7 are allowed to freely use the respective values generated in the control unit 7.

In addition, the impact tool 1 further includes the driver circuit 81, a current measuring unit 82, a voltage measuring unit 83, and a motor rotation measuring unit 84.

The control unit 7 controls the operation of the motor 3. More specifically, the control unit 7 is used along with the driver circuit 81 that supplies a current to the motor 3 and performs feedback control to control the operation of the motor 3. The control unit 7 performs a vector control for controlling, independent of each other, an excitation current (d-axis current) and a torque current (q-axis current) to be supplied to the motor 3.

The current measuring unit 82 includes a plurality of (e.g., two in FIG. 1) current sensors CT1, CT2 and the second coordinate transformer 75. That is to say, the second coordinate transformer 75 serves as not only a constituent element of the current measuring unit 82 but also a constituent element of the control unit 7. The current measuring unit 82 measures an excitation current (a current measured value id1 of the d-axis current) and a torque current (a current measured value iq1 of the q-axis current) to be supplied to the motor 3. That is to say, the current measured values id1, iq1 are obtained by having two-phase currents measured by the two current sensors CT1, CT2 transformed by the second coordinate transformer 75.

Each of the plurality of current sensors CT1, CT2 includes, for example, a hall element or a shunt resistor element. The plurality of current sensors CT1, CT2 measure an electric current supplied from the battery pack to the motor 3 via the driver circuit 81. In this embodiment, three-phase currents (namely, a U-phase current, a V-phase current, and a W-phase current) are supplied to the motor 3. The plurality of current sensors CT1, CT2 measure currents in at least two phases. In FIG. 1, the current sensor CT1 measures the U-phase current to output a current measured value $i_u$1 and the current sensor CT2 measures the V-phase current to output a current measured value $i_v$1.

The motor rotation measuring unit 84 includes, for example, a rotary sensor. The rotary sensor may be, for example, either a magnetic rotary sensor for detecting the rotational angle using a hall element or a photoelectric rotary sensor for detecting the rotational angle using light. The rotary sensor detects the rotational angle θ1 of (the rotor 31 of) the motor 3.

The second coordinate transformer 75 performs, based on the rotational angle θ1, measured by the motor rotation measuring unit 84, of the motor 3, coordinate transformation on the current measured values $i_u$1, $i_v$1 measured by the plurality of current sensors CT1, CT2, thereby calculating current measured values id1, iq1. That is to say, the second coordinate transformer 75 calculates a W-phase current based on the current measured values $i_u$1, $i_v$1 in the U- and V-phases and transforms the current measured values in the three phases (namely, the U-, V-, and W-phases) into a current measured value id1 corresponding to a magnetic field component (d-axis current) and a current measured value iq1 corresponding to a torque component (q-axis current).

The voltage measuring unit 83 measures the voltage applied to the motor 3. The voltage measuring unit 83 measures the voltage applied between the U-phase winding and V-phase winding of the motor 3, for example. Although only one voltage measuring unit 83 is provided in FIG. 1, a plurality of voltage measuring units 83 may be provided instead. The single or plurality of voltage measuring units 83 may measure at least one voltage selected from the group consisting of: the voltage applied between the U-phase winding and the V-phase winding: the voltage applied between the V-phase winding and the W-phase winding: and the voltage applied between the W-phase winding and the U-phase winding.

The estimator 77 performs time differentiation on the rotational angle θ1, measured by the motor rotation measuring unit 84, of the motor 3 to calculate an angular velocity ω1 of the motor 3 (i.e., the angular velocity of the rotor 31).

The command value generator 71 generates a command value col for the angular velocity of the motor 3. The command value generator 71 receives, from the operating member 23, a command value cω0 representing a manipulative variable that indicates how deep the operating member 23 has been pulled, for example. The command value generator 71 generates a command value col corresponding to the command value cω0. That is to say, as the manipulative variable increases, the command value generator 71 increases the command value col of the angular velocity accordingly.

The command value generator 71 includes a decider 710. The decider 710 acquires pieces of information from the impact detector 78, the angular lead measurer 9A, and the thrusting force detector 9B, and makes a predetermined decision based on these pieces of information. The command value generator 71 generates the command value col based on the command value cω0 acquired from the operating member 23 and the decision made by the decider 710. The contents of the decision made by the decider 710 will be described later in the "(6) Exemplary operation" section.

The velocity controller 72 generates a command value ciq1 based on the difference between the command value col generated by the command value generator 71 and the angular velocity ω1 calculated by the estimator 77. The command value ciq1 is a command value specifying the magnitude of a torque current (q-axis current) of the motor 3. That is to say, the control unit 7 controls the operation of the motor 3 to bring the torque current (q-axis current) to be supplied to the coil 321 of the motor 3 closer toward the command value ciq1 (target value). The velocity controller 72 determines the command value ciq1 to make the difference between the command value col and the angular velocity ω1 smaller than a predetermined value.

The flux controller 76 generates a command value cid1 based on the angular velocity ω1 calculated by the estimator 77 and the current measured value iq1 (q-axis current). The command value cid1 is a command value that specifies the magnitude of the excitation current (d-axis current) of the motor 3. That is to say, the control unit 7 controls the operation of the motor 3 to bring the excitation current (d-axis current) to be supplied to the coil 321 of the motor 3 closer toward the command value cid1 (target value).

The command value cid1 generated by the flux controller 76 may be, for example, a command value to set the magnitude of the excitation current at zero. In this embodiment, the flux controller 76 generates the command value cid1 to set the magnitude of the excitation current at zero constantly. Alternatively, the flux controller 76 may also generate a command value cid1 to set the magnitude of the excitation current at a value greater or smaller than zero as needed. When the command value cid1 of the excitation current becomes smaller than zero, a negative excitation current (i.e., a flux-weakening current) flows through the motor 3, thus causing the weakening flux to weaken the magnetic flux that drives the rotor 31.

The current controller 73 generates a command value cvd1 based on the difference between the command value cid1 generated by the flux controller 76 and the current measured value id1 calculated by the second coordinate transformer 75. The command value cvd1 is a command value that specifies the magnitude of an excitation voltage (d-axis voltage) of the motor 3. The current controller 73 determines the command value cvd1 to reduce the difference between the command value cid1 and the current measured value id1. The current controller 73 determines the command value cvd1 to make the difference between the command value cid1 and the current measured value id1 less than a predetermined value.

In addition, the current controller 73 also generates a command value cvq1 based on the difference between the command value ciq1 generated by the velocity controller 72 and the current measured value iq1 calculated by the second coordinate transformer 75. The command value cvq1 is a command value that specifies the magnitude of a torque voltage (q-axis voltage) of the motor 3. The current controller 73 generates the command value cvq1 to reduce the difference between the command value ciq1 and the current measured value iq1. The current controller 73 generates the command value cvq1 to make the difference between the command value ciq1 and the current measured value iq1 less than a predetermined value.

The first coordinate transformer 74 performs coordinate transformation on the command values cvd1, cvq1 based on the rotational angle θ1, measured by the motor rotation measuring unit 84, of the motor 3 to calculate command values $cv_u1$, $cv_v1$, $cv_w1$. Specifically, the first coordinate transformer 74 transforms the command value cvd1 for a magnetic field component (d-axis voltage) and the command value cvq1 for a torque component (q-axis voltage) into command values $cv_u1$, $cv_v1$, $cv_w1$ corresponding to voltages in three phases. Specifically, the command value $cv_u1$ corresponds to a U-phase voltage, the command value $cv_v1$ corresponds to a V-phase voltage, and the command value $cv_w1$ corresponds to a W-phase voltage.

The driver circuit 81 supplies voltages in three phases, corresponding to the command values $cv_u1$, $cv_v1$, $cv_w1$, respectively, to the motor 3. The driver circuit 81 controls the electrical power to be supplied to the motor 3 by performing pulse width modulation (PWM) control.

The motor 3 is driven with the electrical power (voltages in three phases) supplied from the driver circuit 81, thus generating rotational driving force.

As a result, the control unit 7 controls the excitation current such that the excitation current (d-axis current) flowing through the coil 321 of the motor 3 comes to have a magnitude corresponding to the command value cid1 generated by the flux controller 76. In addition, the control unit 7 also controls the angular velocity of the motor 3 such that the angular velocity of the motor 3 becomes an angular velocity corresponding to the command value col generated by the command value generator 71.

The impact detector 78 detects, on finding the current measured value id1 equal to or less than the predetermined value Th5 (refer to FIG. 7), that the impact mechanism 40 is performing the impact operation. Then, the impact detector 78 transmits a signal b1, indicating whether the impact operation is being performed or not, to the command value generator 71.

(4) Details of Vector Control

Figure 6:
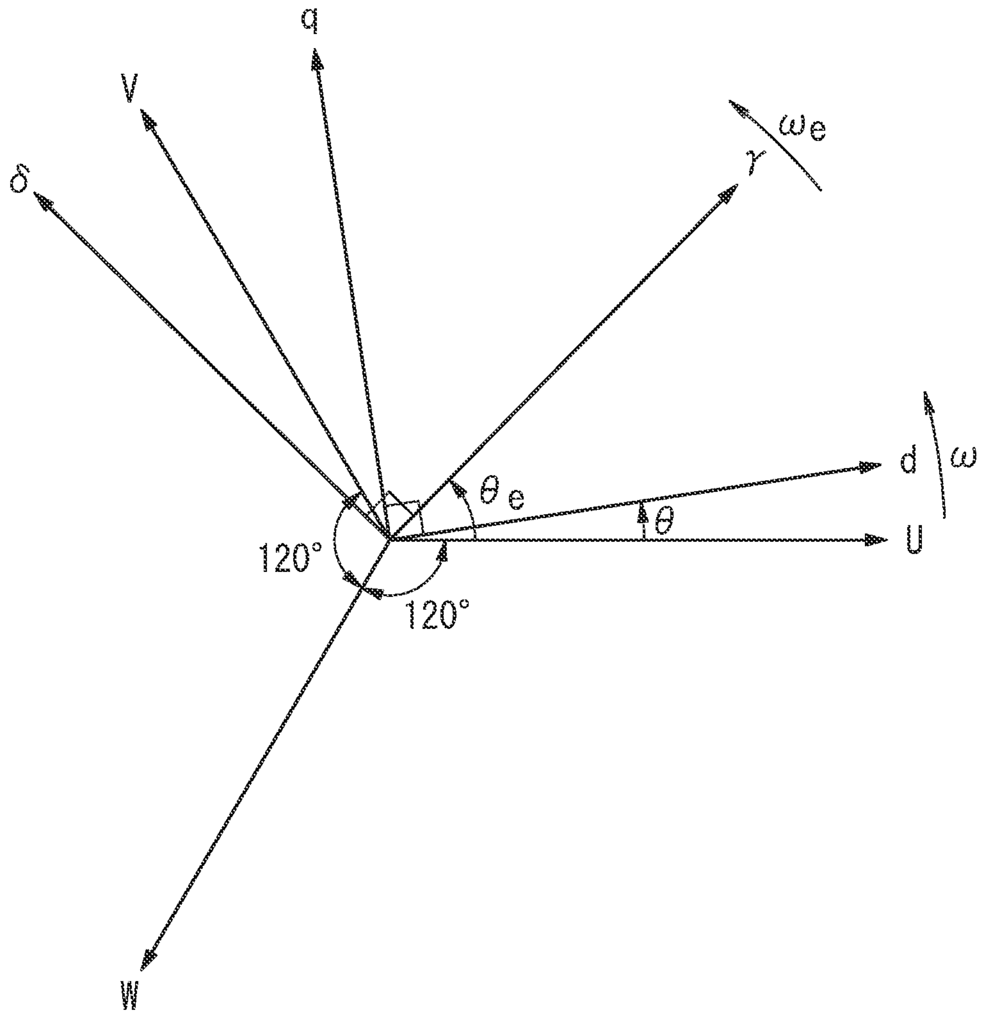
FIG. 6 illustrates how a control unit of the impact tool performs vector control.

Next, the vector control performed by the control unit 7 will be described in further detail. FIG. 6 shows an analysis model of the vector control. In FIG. 6, shown are U-, V-, and W-axes which are armature winding fixed axes for the U-, V-, and W-phases. According to the vector control, a rotational coordinate system rotating at the same rotational velocity as a magnetic flux generated by the permanent magnet 312 provided for the rotor 31 of the motor 3 is taken into account. In the rotational coordinate system, the direction of the magnetic flux generated actually by the permanent magnet 312 is defined by a d-axis and a coordinate axis corresponding to the control of the motor 3 by the control unit 7 and corresponding to the d-axis is defined by a y-axis. A q-axis is set at a phase leading by an electrical angle of 90 degrees with respect to the d-axis. A 8-axis is set at a phase leading by an electrical angle of 90 degrees with respect to the y-axis.

The dq axes have rotated and their rotational velocity is designated by ω. The γδ axes have also rotated and their rotational velocity is designated by $\omega_e$. Note that we in FIG. 6 corresponds with ω1 shown in FIG. 1. Also, in the dq axes, the d-axis angle (phase) as viewed from the U-phase armature winding fixed axis is designated by θ. In the same way, in the γδ axes, the y-axis angle (phase) as viewed from the U-phase armature winding fixed axis is designated by $\theta_e$. Note that $\theta_e$ in FIG. 6 corresponds with θ1 shown in FIG. 1. The angles designated by θ and $\theta_e$ are angles as electrical angles and are generally called "rotor positions" or "magnetic pole positions." The rotational velocities designated by ω and $\omega_e$ are angular velocities represented by electrical angles.

If θ and $\theta_e$ agree with each other, the d-axis and the q-axis agree with the y-axis and the δ-axis, respectively. Basically, the control unit 7 performs the vector control such that θ and $\theta_e$ agree with each other. Thus, in a situation where the command value cid1 of the d-axis current is zero, as the load applied to the motor 3 increases or decreases, the control unit 7 performs control to compensate for the difference thus caused between θ and $\theta_e$, and therefore, the current measured value id1 of the d-axis current comes to have a positive or negative value. Specifically, right after the load applied to the motor 3 has decreased, the current measured value id1 of the d-axis current comes to have a positive value. The instant the load applied to the motor 3 increases, the current measured value id1 comes to have a negative value.

Figure 7:
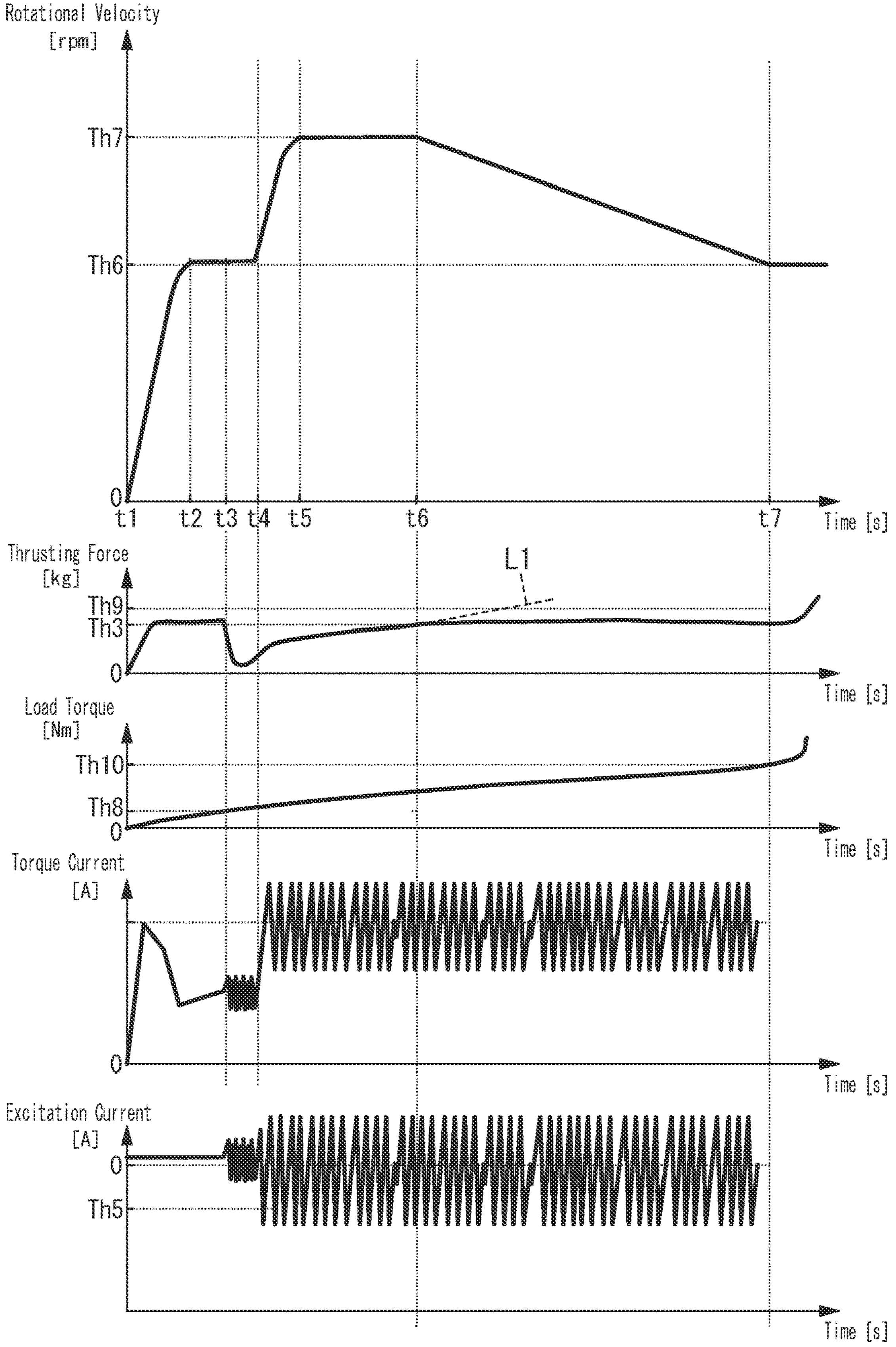
FIG. 7 is a graph showing an exemplary operation of the impact tool.

In a period during which the impact mechanism 40 is performing the impact operation, the load applied to the motor 3 varies more significantly than in a period during which the impact mechanism 40 is not performing the impact operation. Thus, as shown in FIG. 7, the excitation current (with a current measured value id1 of a d-axis current) oscillates in the period during which the impact mechanism 40 is performing the impact operation (i.e., in a predetermined period from a point in time t3 on).

(5) Angular Lead Measuring Unit and Thrusting Force Detector (5-1) Configuration As shown in FIG. 1, the impact tool 1 includes the angular lead measurer 9A. In addition, the impact tool 1 includes the thrusting force detector 9B. At least some constituent elements of the angular lead measurer 9A also serve as at least some constituent elements of the thrusting force detector 9B.

The angular lead measurer 9A measures the angular lead in rotation of the anvil 45 over the hammer 42. The thrusting force detector 9B detects the thrusting force F1 applied to the output shaft 61. As used herein, the "thrusting force F1" refers to the force applied in a direction aligned with the thrusting direction defined for the output shaft 61. More specifically, the thrusting force F1 is either the force applied from the output shaft 61 to the tip tool 62 or the reactive force applied from the tip tool 62 to the output shaft 61.

The angular lead measurer 9A and the thrusting force detector 9B each include a computer system including one or more processors and a memory. At least some functions of the angular lead measurer 9A and the thrusting force detector 9B 7 are performed by making the one or more processors of the computer system execute a program stored in the memory of the computer system. The program may be stored in the memory. The program may also be downloaded via a telecommunications line such as the Internet or distributed after having been stored in a non-transitory storage medium such as a memory card.

The angular lead measurer 9A includes an impact interval measurer 91, a hammer rotation measurer 92, and a calculator 93. The thrusting force detector 9B includes the impact interval measurer 91, the hammer rotation measurer 92, and a processor 94. Note that these constituent elements do not necessarily have a substantive configuration but just represent functions to be performed by the angular lead measurer 9A and the thrusting force detector 9B.

The angular lead measurer 9A and the thrusting force detector 9B further include the current measuring unit 82. Note that in FIG. 1, the current measuring unit 82 is illustrated outside of the angular lead measurer 9A and the thrusting force detector 9B.

The impact interval measurer 91 measures the impact interval of the hammer 42. As used herein, the impact interval of the hammer 42 (hereinafter simply referred to as an "impact interval") refers to a time interval at which the hammer 42 applies impacting force to the anvil 45. The hammer rotation measurer 92 measures the rotational velocity of the hammer 42. The calculator 93 calculates, based on the impact interval measured by the impact interval measurer 91 and the rotational velocity of the hammer 42 as measured by the hammer rotation measurer 92, the angular lead in rotation of the anvil 45 over the hammer 42.

(5-2) Impact Interval Measurer

The current measuring unit 82 measures the excitation current flowing through the motor 3 as described above. The impact interval measurer 91 measures the impact interval based on the current measured value id1 of the excitation current that has been measured by the current measuring unit 82. This enables measuring the impact interval accurately.

More specifically, the impact interval measurer 91 measures, as the impact interval, a time interval at which the excitation current (current measured value id1) measured by the current measuring unit 82 becomes equal to or less than a predetermined value Th5 (refer to FIG. 7). That is to say, every time the hammer 42 collides against the anvil 45 while the impact mechanism 40 is performing the impact operation, the load applied to the motor 3 varies. This variation manifests itself as a variation in excitation current. This allows the impact interval measurer 91 to measure the impact interval based on the excitation current. The predetermined value Th5 is a negative value.

The current measured value id1 of the excitation current may vary as shown in FIG. 7, for example. At a point in time t3, the impact mechanism 40 starts performing the impact operation, thus causing the current measured value id1 to oscillate. Thereafter, from a point in time t4 on, every time the current measured value id1 reaches a valley of its waveform, the current measured value id1 becomes equal to or less than the predetermined value Th5. This allows the impact interval measurer 91 to measure the impact interval. Optionally, the impact interval measurer 91 may also serve as the impact detector 78.

(5-3) Hammer Rotation Measurer

The hammer rotation measurer 92 acquires the angular velocity ω1 of the motor 3 (i.e., the rotational velocity of the motor 3) from the estimator 77 (refer to FIG. 1). The hammer rotation measurer 92 measures the rotational velocity of the hammer 42 based on the angular velocity ω1. More specifically, the hammer rotation measurer 92 calculates the angular velocity (rotational velocity) of the hammer 42 by dividing the angular velocity ω1 by the gear ratio of the planetary gear mechanism 48.

Optionally, the hammer rotation measurer 92 may include a rotary sensor, for example, and may measure the rotational velocity of the hammer 42 by differentiating the rotational angle of the hammer 42 that has been detected by the rotary sensor. That is to say, the hammer rotation measurer 92 may measure the rotational velocity of the hammer 42 directly, instead of measuring the rotational velocity of the hammer 42 indirectly based on the rotational velocity of the motor 3.

(5-4) Calculator

Next, the principle on which the calculator 93 calculates the angular lead will be described with reference to FIGS. 8A and 8B. In the following description, the two projections 425 of the hammer 42 will be hereinafter referred to as a "projection 425A" and a "projection 425B," respectively, to distinguish the two projections 425 from each other. In addition, the two claws 455 of the anvil 45 will be hereinafter referred to as a "claw 455A" and a "claw 455B," respectively, to distinguish the two claws 455 from each other.

Figure 8A:
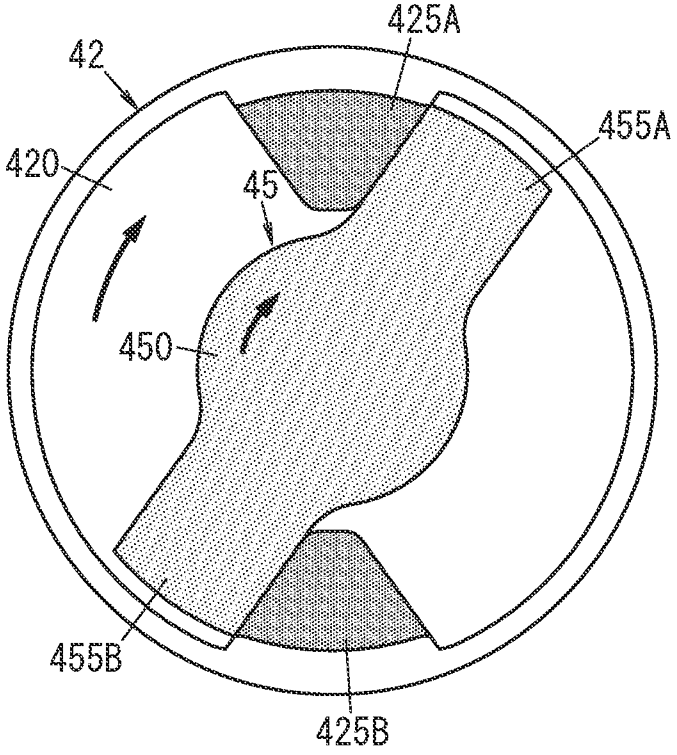
FIGS. 8A and 8B illustrate how a hammer and anvil of the impact tool operate.
Figure 8B:
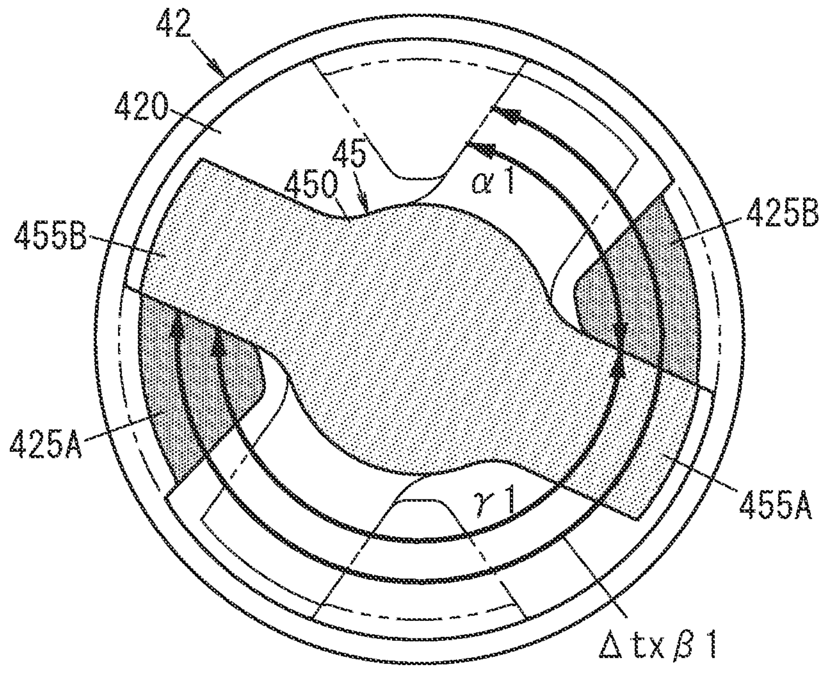

The hammer 42 rotates in the clockwise direction in FIGS. 8A and 8B. As the hammer 42 rotates, the projection 425A collides against the claw 455A and the projection 425B collides against the claw 455B as shown in FIG. 8A. This causes the anvil 45 to rotate in the same direction as the hammer 42.

After each projection 425 has collided against one of the claws 455, the hammer 42 retreats to cause the projections 425A, 425B to go over the claws 455A, 455B, respectively. Thereafter, the hammer 42 rotates at least 180 degrees. Then, the projection 425A collides against the claw 455B and the projection 425B collides against the claw 455A as shown in FIG. 8B. The interval between a point in time when the two projections 425 of the hammer 42 have collided against the two claws 455 of the anvil 45 at the positions shown in FIG. 8A and a point in time when the projections 425 and the claws 455 collide against each other at the positions shown in FIG. 8B corresponds to the impact interval.

In this case, the angular lead in rotation of the anvil 45 is expressed by the rotational angle $\alpha 1$ of the anvil 45. The rotational angle $\alpha 1$ is the rotational angle of the anvil 45 in the interval between the point in time when the projections 425 have collided against the claws 455 one time and the point in time when the projections 425 collide against the claws 455 next time. In FIG. 8B, the positions of the two projections 425 and the two claws 455 at the point in time shown in FIG. 8A are indicated in phantom by the two-dot chain. As shown in FIG. 8B, in the interval between the point in time when the projection 425A has collided against the claw 455A and the point in time when the projection 425A collides against the claw 455B (i.e., in the impact interval), the anvil 45 rotates by the rotational angle $\alpha 1$. That is to say, in the interval between the point in time when the projection 425B has collided against the claw 455B and the point in time when the projection 425B collides against the claw 455A, the anvil 45 rotates by the rotational angle $\alpha 1$.

The calculator 93 calculates the rotational angle $\alpha 1$ (angular lead) by the following Equation (1):

$$\alpha 1 = \Delta t \times \beta 1 - \gamma 1 \quad (1)$$

where the unit of the rotational angle $\alpha 1$ is degrees, $\Delta t$ is the impact interval (in seconds) measured by the impact interval measurer 91, $\beta 1$ is the rotational velocity (in degrees per second) of the hammer 42, and $\gamma 1$ is a number representing, by an angle (in degrees), the interval between one projection 425 and another projection 425 adjacent to the former projection 425 in the rotational direction of the hammer 42. If a plurality of projections 425 are arranged at regular interval as in this embodiment, $\gamma 1 = 360/$(number of projections 425). That is to say, in this embodiment, $\gamma 1 = 180$.

As shown in FIG. 8B, the hammer 42 rotates $\Delta t \times \beta 1$ degrees in the impact interval. The projections 425 are arranged at an interval of $\gamma 1$ degrees. Thus, if the anvil 45 were fixed, then $\Delta t \times \beta 1 = \gamma 1$ would be satisfied. Actually, however, the anvil 45 rotates by the rotational angle $\alpha 1$ [degrees] in the impact interval, and therefore, $\Delta t \times \beta 1 = \gamma 1 + \alpha 1$ is satisfied. That is to say, the relation expressed by Equation (1) is satisfied.

There is a correlation between the angular lead (rotational angle $\alpha 1$) and the tightness of fastening by the impact tool 1. As used herein, the "tightness of fastening" is a concept that covers both the tightness of the screw 63 being tightened and the tightness of the screw 63 being loosened. In other words, the "tightness of fastening" is the magnitude of torque required to tighten or loosen the screw 63. Various types of screws 63 were provided and the angular lead (rotational angle $\alpha 1$) when each of those screws 63 was fastened was measured. The results are shown in FIGS. 9A-9F.

Figure 9A:
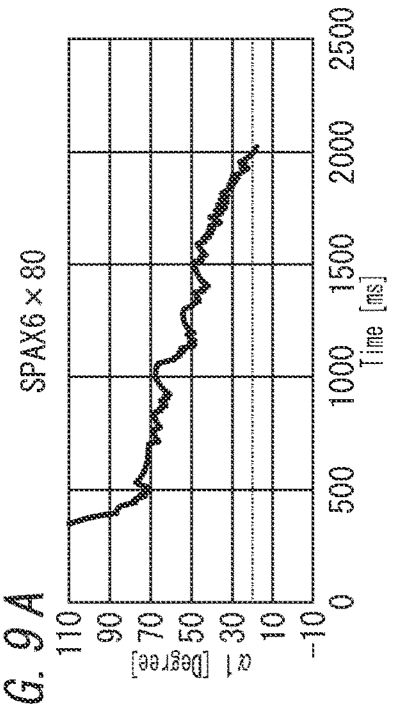
FIGS. 9A-9F are graphs each showing an angular lead measured by the impact tool.
Figure 9B:
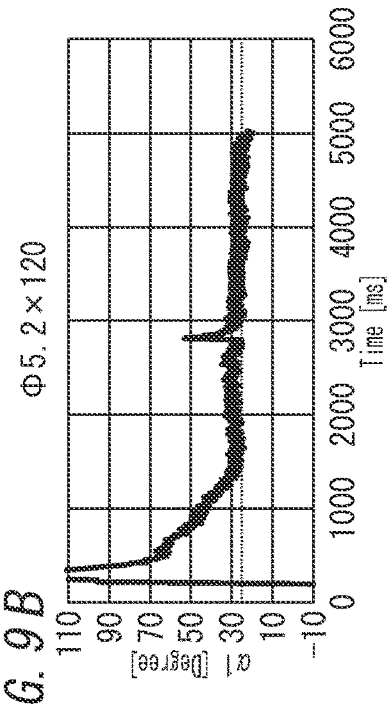
Figure 9C:
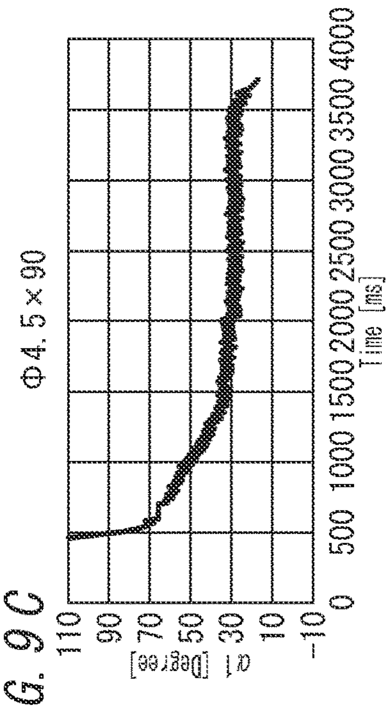
Figure 9D:
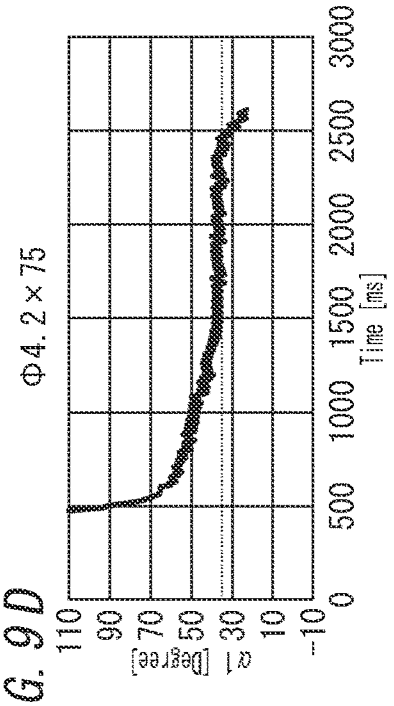
Figure 9E:
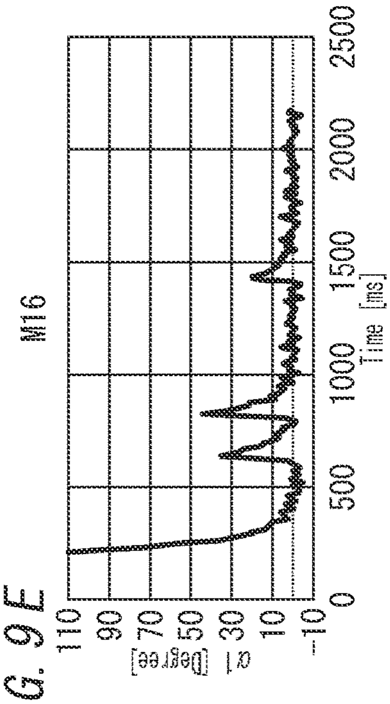
Figure 9F:
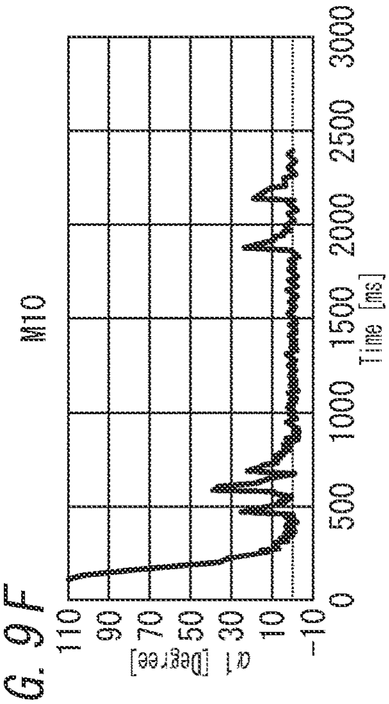

In FIGS. 9A-9F, the ordinate indicates the rotational angle $\alpha 1$ and the abscissa indicates the time. The types of the screws 63 used were wood screws in FIGS. 9A-9D and hexagonal bolts in FIGS. 9E and 9F. The dimensions of the screws 63 were as follows. Specifically, in FIG. 9B, the screw 63 had a diameter of 5.2 mm and a length of 120 mm. In FIG. 9C, the screw 63 had a diameter of 4.5 mm and a length of 90 mm. In FIG. 9D, the screw 63 had a diameter of 4.2 mm and a length of 75 mm. Also, the dimensions of the screw 63 in FIG. 9E are compliant with the JIS standard M16 for hexagonal bolts. The dimensions of the screw 63 in FIG. 9F are compliant with the JIS standard M10 for hexagonal bolts.

The screw 63 is screwed into a target to be fastened such as a piece of wood or a metal plate. When the rotational angle $\alpha 1$ has just started to be measured, the screw 63 has not been firmly fixed onto the target to be fastened, and therefore, there is relatively low resistance that impedes the rotation of the anvil 45 being struck by the hammer 42. As a result, the rotational angle $\alpha 1$ comes to have a relatively large value. With the passage of time, however, the screw 63 is fixed increasingly firmly onto the target to be fastened, thus causing an increase in the resistance and a decrease in the rotational angle $\alpha 1$ accordingly.

In FIGS. 9A-9F, the period in which the rotational angle $\alpha 1$ is plotted corresponds to the time it takes for the impact mechanism 40 to finish the impact operation since the impact mechanism 40 has started performing the impact operation (hereinafter referred to as an "impact period"). In addition, in each of these drawings, the rotational angle $\alpha 1$ varies within a range equal to or greater than a predetermined value substantially throughout the impact period. Specifically, the rotational angle $\alpha 1$ varies within a range equal to or greater than about 20 degrees in FIG. 9A, within a range equal to or greater than about 25 degrees in FIG. 9B, within a range equal to or greater than about 30 degrees in FIG. 9C, within a range equal to or greater than about 35 degrees in FIG. 9D, and within a range equal to or greater than about 0 degrees in FIGS. 9E and 9F.

In general, a bolt is tighter to fasten than a wood screw is. Also, the larger the diameter of a screw 63 is, the tighter to fasten the screw 63 is. Furthermore, the longer the length of a screw 63 is, the tighter to fasten the screw 63 is. As can be seen from FIGS. 9A-9F, the tighter to fasten a given screw 63 is, the smaller the angular lead (rotational angle $\alpha 1$) thereof tends to be.

In view of this tendency, the decider 710 of the command value generator 71 is configured to decide that the smaller the angular lead (rotational angle $\alpha 1$) is, the tighter to fasten the given screw 63 should be. More specifically, the decider 710 classifies, according to the magnitude of the rotational angle $\alpha 1$, the degrees of tightness of fastening into a plurality of (e.g., two in this example) levels. Specifically, when finding the rotational angle $\alpha 1$ larger than a first threshold value $Th1$ (refer to FIG. 10), the decider 710 decides that the degree of tightness of fastening should be relatively low. On the other hand, when finding the rotational angle $\alpha 1$ equal to or less than the first threshold value $Th1$, the decider 710 decides that the degree of tightness of fastening should be relatively high. The first threshold value $Th1$ may be, for example, 15 degrees.

The impact tool 1 according to this embodiment measures the angular lead and controls the motor 3 based on the angular lead thus measured. This allows the measurement to be done more easily than in a situation where the tightness of fastening is determined by measuring the degrees of tightness of the screw 63 and the target to be fastened and the motor 3 is controlled based on the tightness of fastening. In addition, the angular lead is closely correlated to the tightness of fastening, thus enabling controlling the motor 3 significantly more accurately. For example, referring to the angular lead may enable controlling the motor 3 with the effects of the respective shapes of the screw 63, a prepared hole, and the screw hole 640 taken into account as factors that would affect the tightness of fastening.

(5-5) Processor

The processor 94 of the thrusting force detector 9B determines the thrusting force F1 based on the rotational velocity (angular velocity) of the hammer 42 as measured by the hammer rotation measurer 92. As used herein, the thrusting force F1 refers to the force applied to the output shaft 61, more specifically, the force applied in a direction aligned with the thrusting direction (forward/backward direction) defined for the output shaft 61.

The processor 94 determines the thrusting force F1 by calculation. The thrusting force F1 is given by the following Equation (2):

$$F1=Fth+F\text{float} \quad (2)$$

where Fth is a force component, applied in the thrusting direction, of the impacting force applied from the hammer 42 to the anvil 45 and Ffloat is a load applied in the thrusting direction and caused by torsional torque of the tip tool 62.

Figure 5:
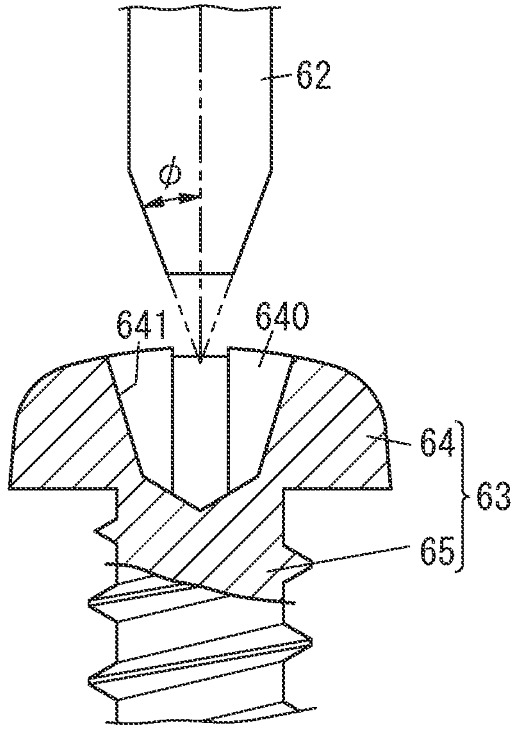
FIG. 5 is a cross-sectional view of a screw to be fastened by the impact tool.

Fth and Ffloat are expressed by the following Equations (3) and (4), respectively:

$$Fth=A\omega_{ds} \quad (3)$$

$$F\text{float}=B\omega_{ds}\tan\varphi \quad (4)$$

where $\omega_{ds}$ is the angular velocity of the hammer 42 as measured by the hammer rotation measurer 92 and φ is the angle formed between the thrusting direction and the outer surface of the tip tool 62 (refer to FIG. 5).

"A" is a coefficient calculated based on a first parameter contributing to the impact torque generated by the impact mechanism 40. Examples of the first parameter include parameters depending on the part shape of the impact mechanism 40 such as the moment of inertia of the hammer 42 and the spring constant of the return spring 43 and the impact angle defined by the hammer 42 with respect to the anvil 45. The coefficient "A" may be obtained, for example, by experiment using an actual impact tool 1.

"B" is also a coefficient calculated based on a second parameter contributing to the impact torque generated by the impact mechanism 40. Examples of the second parameter include parameters depending on the part shape of the impact mechanism 40 such as the moment of inertia of the hammer 42, the spring constant of the return spring 43, the moment of inertia of the output shaft 61, and the outside diameter of the output shaft 61. The coefficient "B" may be obtained, for example, by calculation.

Note that these Equations (3) and (4) are approximate expressions. Also, Equations (2), (3), and (4) are only exemplary equations for determining the thrusting force F1. Alternatively, the thrusting force F1 may also be determined by any other equation. Still alternatively, the thrusting force F1 may also be determined based on the impact interval measured by the impact interval measurer 91.

(6) Exemplary Operation (6-1) Operation Flow

The control unit 7 controls the motor 3 while changing the control mode from one of a plurality of modes into another. Examples of the plurality of modes include a first control mode, a second control mode, and a normal mode. In the normal mode, the control unit 7 controls the motor 3 in accordance with an operation that has been performed on the operating member 23 (refer to FIG. 2). In the first control mode, the control unit 7 controls the motor 3 based on not only the specifics of the operation performed on the operating member 23 but also the thrusting force F1 detected by the thrusting force detector 9B. In the second control mode, the control unit 7 controls the motor 3 based on not only the specifics of the operation performed on the operating member 23 but also the current measured value id1 of the excitation current.

Figure 10:
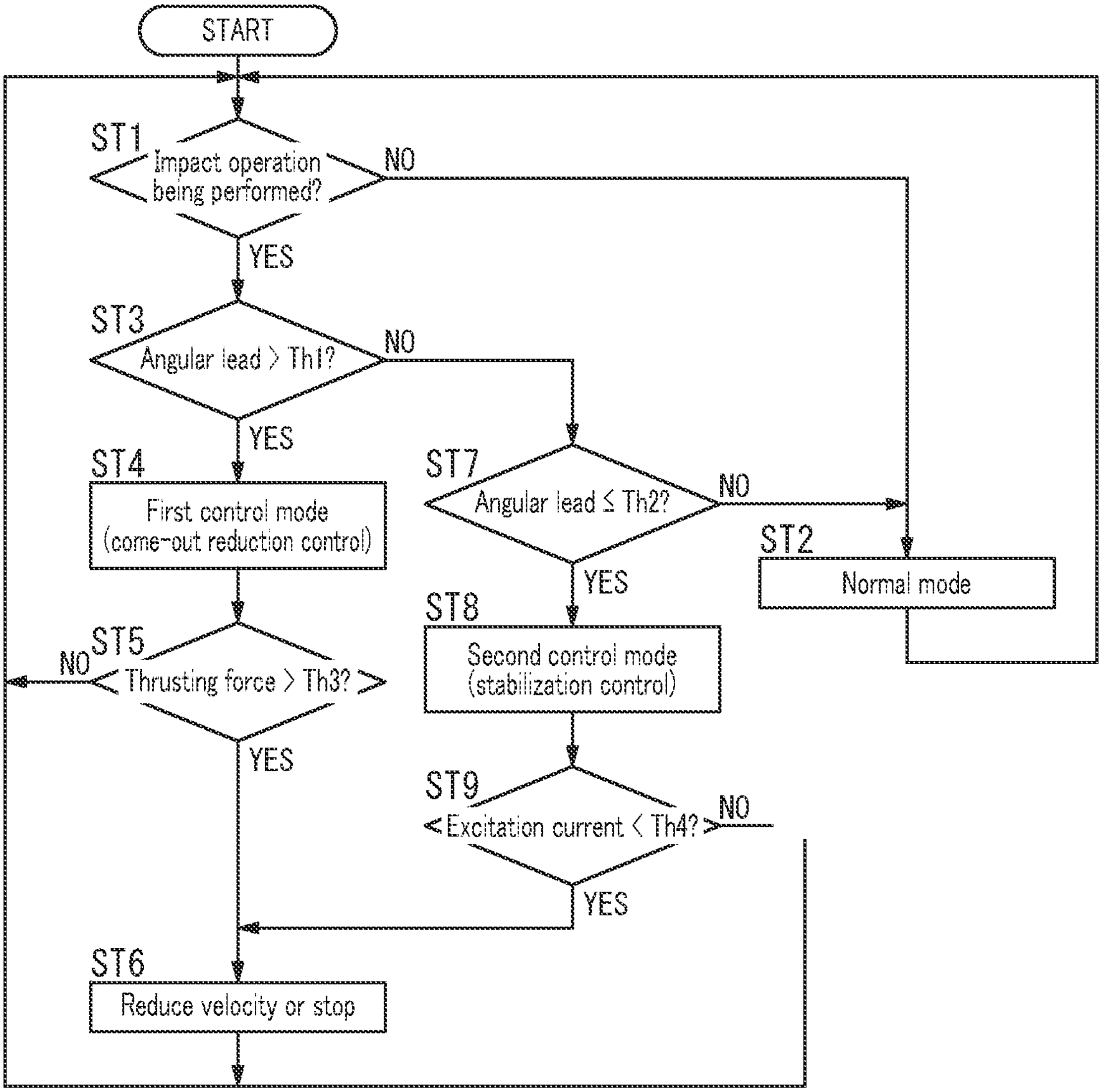
FIG. 10 is a flowchart showing a method for controlling the impact tool.

FIG. 10 shows an exemplary operation flow of the impact tool 1 according to this embodiment. First, the impact detector 78 attempts to detect the impact operation which may be being performed by the impact mechanism 40 (in Step ST1). If the impact detector 78 has detected no impact operation (i.e., unless the impact mechanism 40 is performing any impact operation), the answer is NO to the query in Step ST1 and the control unit 7 controls the motor 3 in the normal mode (in Step ST2). Thereafter, the control unit 7 goes back to the decision step ST1.

On the other hand, if the impact detector 78 has detected any impact operation (i.e., if the impact mechanism 40 is performing an impact operation), then the answer is YES to the query in Step ST1. In that case, the decider 710 of the command value generator 71 (refer to FIG. 1) compares the angular lead (rotational angle α1) measured by the angular lead measurer 9A with the first threshold value Th1 (in Step ST3). A state where the angular lead is greater than the first threshold value Th1 corresponds to a state where the screw 63 has been fastened relatively loosely (i.e., the load is relatively light). The control unit 7 changes, when finding the angular lead greater than the first threshold value Th1 (if the answer is YES in Step ST3), the control mode into the first control mode (in Step ST4).

In the first control mode, the control unit 7 compares the thrusting force F1 measured by the thrusting force detector 9B with a third threshold value Th3 (in Step ST5). When finding the thrusting force F1 greater than the third threshold value Th3 (if the answer is YES in Step ST5), the control unit 7 has either the rotational velocity of the motor 3 reduced or rotation thereof stopped (in Step ST6). That is to say, the command value generator 71 of the control unit 7 decreases the command value col of the angular velocity of the motor 3. Thereafter, the control unit 7 goes back to the decision step ST1.

In the first control mode, if the thrusting force F1 is equal to or less than the third threshold value Th3 (if the answer is NO in Step ST5), then the control of the motor 3 by the control unit 7 may be the same as the control in the normal mode, for example. Thereafter, the control unit 7 goes back to the decision step ST1.

If the angular lead turns out, in Step ST3, to be equal to or less than the first threshold value Th1 (if the answer is NO in Step ST3), then the decider 710 compares the angular lead (rotational angle α1) measured by the angular lead measurer 9A with the second threshold value Th2 (in Step ST7). A state where the angular lead is equal to or less than the second threshold value Th2 corresponds to a state where the screw 63 has been fastened relatively tightly (i.e., the load is relatively heavy). The control unit 7 changes, when finding the angular lead equal to or less than the second threshold value Th2 (if the answer is YES in Step ST7), the control mode into the second control mode (in Step ST8).

The second threshold value Th2 may be equal to the first threshold value Th1, for example. In that case, if the answer is NO in Step ST3, then Step ST8 is performed with Step ST7 skipped.

In the second control mode, the control unit 7 compares the current measured value id1 of the excitation current with a fourth threshold value Th4 (in Step ST9). The fourth threshold value Th4 is a negative value. When finding the current measured value id1 less than the fourth threshold value Th4 (if the answer is YES in Step ST9), the control unit 7 has either the rotational velocity of the motor 3 reduced or the rotation thereof stopped (in Step ST6). That is to say, the command value generator 71 of the control unit 7 decreases the command value col of the angular velocity of the motor 3. Thereafter, the control unit 7 goes back to the decision step ST1.

In the second control mode, if the current measured value id1 is equal to or greater than the fourth threshold value Th4 (if the answer is NO in Step ST9), then the control of the motor 3 by the control unit 7 may be the same as the control in the normal mode, for example. Thereafter, the control unit 7 goes back to the decision step ST1.

If the angular lead turns out, in Step ST7, to be greater than the second threshold value Th2 (if the answer is NO in Step ST7), then the control unit 7 control the motor 3 in the normal mode (in Step ST2). Thereafter, the control unit 7 goes back to the decision step ST1.

The control unit 7 changes the control mode based on the angular lead (rotational angle α1) throughout the interval from a point in time when the impact detector 78 has detected the impact operation through a point in time when the motor 3 stops running. Meanwhile, the control unit 7 controls the motor 3 in the normal mode in the interval from a point in time when the motor 3 has started running through a point in time when the impact detector 78 detects the impact operation.

Note that the flowchart shown in FIG. 10 shows only an exemplary operation flow of the impact tool 1. Thus, the processing steps shown in FIG. 10 may be performed in a different order as appropriate. An additional processing step may be performed as needed, or any of the processing steps shown in FIG. 10 may be omitted as appropriate.

(6-2) Restriction Processing

The restriction processing is herein defined to be processing including at least one of reducing the rotational velocity of the output shaft 61 to a lower value than in the normal mode or stopping rotation of the output shaft 61. The first control mode and the second control mode described above correspond to a velocity reduction mode in which the restriction processing (i.e., the processing in Step ST6) is performed depending on the condition. That is to say, the plurality of modes of the control unit 7 includes the normal mode in which the output shaft 61 is allowed to rotate and the velocity reduction mode in which the restriction processing is performed depending on the condition.

Also, in the first control mode, the restriction processing is performed when the thrusting force F1 is greater than the third threshold value Th3. Such a control in the first control mode corresponds to the come-out reduction control. The come-out reduction control is a control for reducing the chances of causing the come-out phenomenon. The come-out reduction control will be described in detail later in the next "(7) Come-out reduction control" section.

Furthermore, in the second control mode, the restriction processing is performed when the current measured value id1 of the excitation current is less than the fourth threshold value Th4. Such a control in the second control mode corresponds to the stabilization control. The stabilization control is a control for reducing the unstable behavior (maximum retreat) of the hammer 42. The stabilization control will be described in detail later in the "(8) Stabilization control" section.

The following Table 1 summarizes the correspondence between the magnitude of the angular lead (rotational angle α1), the degree of tightness of fastening, the control mode of the control unit 7, and the specifics of the control:

TABLE 1

| Angular lead | Tightness of fastening | Control mode | Control | Control parameter |
|---|---|---|---|---|
| Large | Low | 1st control mode | Come-out reduction | Thrusting force |
| Small | High | 2nd control mode | Stabilization | Excitation current |

(6-3) First Condition and Second Condition

As described above, the control unit 7 performs the come-out reduction control when the first predetermined condition is satisfied and performs the stabilization control when the second predetermined condition is satisfied. At least one of the first condition or the second condition is a condition on the angular lead measured by the angular lead measurer 9A.

More specifically, the first condition is a condition that the impact detector 78 have detected the impact operation and the angular lead (rotational angle α1) be greater than the first threshold value Th1. That is to say, the first condition includes a condition that the angular lead be greater than the first threshold value Th1. If the first condition is satisfied, then the control mode of the control unit 7 turns into the first control mode and the come-out reduction control is performed.

On the other hand, the second condition is a condition that the impact detector 78 have detected the impact operation, the angular lead (rotational angle α1) be equal to or less than the first threshold value Th1, and the angular lead (rotational angle α1) be equal to or less than the second threshold value Th2. That is to say, the second condition includes a condition that the angular lead be equal to or less than the second threshold value Th2. If the second condition is satisfied, then the control mode of the control unit 7 turns into the second control mode and the stabilization control is performed.

The control unit 7 determines whether the first condition is satisfied or not and whether the second condition is satisfied or not throughput the interval from a point in time when the impact detector 78 has detected the impact operation through a point in time when the motor 3 stops running. The control unit 7 performs the come-out reduction control when the first condition is satisfied and performs the stabilization control when the second condition is satisfied.

(6-4) Thrusting Force Condition

Also, the control unit 7 performs the restriction processing when a thrusting force condition is satisfied. As used herein, the thrusting force condition is a condition on the thrusting force F1 detected by the thrusting force detector 9B. In this embodiment, the thrusting force condition includes a condition that the thrusting force F1 be greater than the third threshold value Th3 (thrusting force threshold value) (corresponding to a situation where the answer is NO in Step ST5 in FIG. 10). The restriction processing includes at least one of reducing the rotational velocity of the output shaft 61 or stopping rotation of the output shaft 61.

The control unit 7 determines whether the thrusting force condition is satisfied or not throughput the interval from a point in time when the impact detector 78 has detected the impact operation through a point in time when the motor 3 stops running. The control unit 7 performs the restriction processing when the thrusting force condition is satisfied.

More specifically, when not only an angular lead condition on the angular lead measured by the angular lead measurer 9A but also the thrusting force condition are satisfied, the control unit 7 performs the restriction processing. The angular lead condition includes a condition that the angular lead (rotational angle α1) be greater than an angular lead threshold value (first threshold value Th1) (corresponding to a situation where the answer is YES in Step ST3).

(7) Come-Out Reduction Control

Next, an exemplary operation in a situation where the come-out reduction control is performed will be described with reference to FIG. 7. In the foregoing description, the command value generator 71 is supposed to generate the command value col of the angular velocity of the motor 3. In the following description, the command value generator 71 is supposed to generate a command value of the rotational velocity of the motor 3.

At a point in time t1, the worker operates the operating member 23 to make the motor 3 start running. At the point in time when the motor 3 starts running, the impact mechanism 40 is not performing the impact operation. At this time, the upper limit value of the rotational velocity of the motor 3 is set at a first setting Th6. The command value generator 71 sets the command value of the rotational velocity of the motor 3 at a value equal to or less than the upper limit value. That is to say, when the operating member 23 is pulled to the maximum depth, the command value of the rotational velocity of the motor 3 becomes equal to the upper limit value. In FIG. 7, the rotational velocity of the motor 3 reaches the upper limit value (first setting Th6) at a point in time t2.

The control unit 7 controls the rotational velocity of the output shaft 61 to a value equal to or less than the upper limit value of the rotational velocity of the output shaft 61 by controlling the rotational velocity of the motor 3 to a value equal to or less than the upper limit value of the rotational velocity of the motor 3.

At a point in time t3, the load torque of the output shaft 61 becomes equal to or greater than a predetermined value Th8. Then, the impact mechanism 40 starts performing the impact operation. Thereafter, the current measured value id1 of the excitation current becomes equal to or less than a predetermined value Th5. At a point in time t4, the impact detector 78 decides that the current measured value id1 have become equal to or less than the predetermined value Th5, thereby detecting that the impact mechanism 40 is performing the impact operation.

From the point in time t4 on when the impact detector 78 detects the impact operation, the decider 710 compares the angular lead (rotational angle α1) measured by the angular lead measurer 9A with the first threshold value Th1 and the second threshold value Th2 (in Steps ST3 and ST7 shown in FIG. 10). In this case, suppose the rotational angle α1 is greater than the first threshold value Th1 and the control mode of the control unit 7 turns into the first control mode. That is to say, the control unit 7 performs the come-out reduction control in the first control mode.

As soon as the impact detector 78 detects the impact operation, the control unit 7 (command value generator 71) raises the upper limit value of the rotational velocity of the motor 3. Thus, the control unit 7 (command value generator 71) raises the upper limit value of the rotational velocity of the output shaft 61. In this embodiment, if the control mode of the control unit 7 is the first control mode when the impact detector 78 detects the impact operation, the control unit 7 raises the upper limit value of the rotational velocity of the output shaft 61. On the other hand, if the control mode of the control unit 7 is the second control mode, the control unit 7 maintains the upper limit value of the rotational velocity of the output shaft 61. That is to say, the larger the angular lead is, the more significantly the control unit 7 increases the upper limit value of the rotational velocity of the output shaft 61.

In FIG. 7, at the point in time t4 when the impact detector 78 detects the impact operation, the upper limit value of the rotational velocity of the motor 3 is raised to a second setting Th7. The second setting Th7 is larger than the first setting Th6 at the point in time when the motor 3 has started running. If the operating member 23 is pulled sufficiently deeply after the upper limit value of the rotational velocity of the motor 3 has been raised, then the rotational velocity of the motor 3 increases to a new upper limit value (second setting Th7) as in the interval between the points in time t4 and t5 shown in FIG. 10.

In the first control mode (come-out reduction control), the decider 710 compares the thrusting force F1 detected by the thrusting force detector 9B with the third threshold value Th3. More specifically, the decider 710 compares the thrusting force F1 with the third threshold value Th3 at predetermined time intervals. At a point in time t6, the thrusting force F1 exceeds the third threshold value Th3. Then, the control unit 7 (command value generator 71) reduces the rotational velocity of the motor 3. More specifically, the control unit 7 (command value generator 71) lowers the upper limit value of the rotational velocity of the motor 3. Then, if the operating member 23 has been pulled sufficiently deeply to say the least, the rotational velocity of the motor 3 decreases, and therefore, the rotational velocity of the output shaft 61 also decreases. That is to say, reducing the rotational velocity includes not only decreasing the rotational velocity directly but also decreasing the upper limit value of the rotational velocity as well.

For example, every time the thrusting force F1 exceeds the third threshold value Th3, the control unit 7 lowers the upper limit value of the rotational velocity of the motor 3. As another example, once the thrusting force F1 has exceeded the third threshold value Th3, the control unit 7 may decrease the upper limit value of the rotational velocity of the motor 3 gradually. Also, the control unit 7 may stop running the motor 3 and thereby stop rotating the output shaft 61.

If the thrusting force F1, i.e., the force acting between the output shaft 61 and the tip tool 62, is excessive, then the come-out phenomenon is likely to occur. Reducing the rotational velocity of the motor 3 enables reducing an increase in the thrusting force F1. For example, in the normal mode, the control of reducing the rotational velocity of the motor 3 according to the thrusting force F1 is not performed. Thus, in the normal mode, the thrusting force F1 may exceed a threshold value Th9 (where Th9>Th3) as indicated by the dotted line in FIG. 7. In contrast, when the control unit 7 changes its control mode into the first control mode to reduce the rotational velocity of the motor 3, the thrusting force F1 may be controlled to the threshold value Th9 or less. Reducing an increase in the thrusting force F1 enables reducing the chances of causing the come-out phenomenon. That is to say, the come-out reduction control is control including at least one of reducing the rotational velocity of the output shaft 61 or stopping rotation of the output shaft 61 such that the thrusting force F1 detected by the thrusting force detector 9B becomes equal to or less than the predetermined value (threshold value Th9).

In addition, the come-out reduction control also reduces the thrusting force F1, thus reducing the chances of the thrusting force F1 becoming so strong as to strip the head of the screw.

Optionally, while the come-out reduction control is performed, the control unit 7 may control the rotational velocity of the output shaft 61 such that the thrusting force F1 detected by the thrusting force detector 9B either becomes equal to a predetermined value or falls within a predetermined range. This enables stabilizing the work. For example, the control unit 7 may control the rotational velocity of the output shaft 61 such that the thrusting force F1 becomes equal to the third threshold value Th3. If the thrusting force F1 is going to diverge from the third threshold value Th3, then the control unit 7 may control, by feedback control, the rotational velocity of the output shaft 61 to make the thrusting force F1 converge toward the third threshold value Th3 again.

Alternatively, the control unit 7 may also control the rotational velocity of the output shaft 61 such that the thrusting force F1 falls within a predetermined range including the third threshold value Th3. If the thrusting force F1 is going to deviate from the predetermined range, then the control unit 7 may control, by feedback control, the rotational velocity of the output shaft 61 to make the thrusting force F1 enter the predetermined range again.

Optionally, if the predetermined condition is satisfied in the first control mode, then the control unit 7 may stop performing the control of decreasing the upper limit value of the rotational velocity of the motor 3. In this case, the predetermined condition is supposed to be a condition that the difference between the upper limit value of the rotational velocity of the motor 3 and the first setting Th6 be equal to or less than a predetermined value. In FIG. 7, at a point in time t7, the difference between the upper limit value of the rotational velocity of the motor 3 and the first setting Th6 becomes approximately equal to zero and the predetermined condition is satisfied. In response, the control unit 7 stops performing the control of decreasing the upper limit value of the rotational velocity of the motor 3. Alternatively, when the predetermined condition is satisfied, the control unit 7 may change the control mode into the normal mode.

Still alternatively, the predetermined condition may also be a condition that the screw 63 be seated. When the load torque of the output shaft 61 exceeds a threshold value Th10 (refer to the point in time t7) or an increase rate of the load torque exceeds a threshold value as shown in FIG. 7, for example, a decision may be made that the screw 63 be seated. Alternatively, when the load torque enters a predetermined range, a decision may be made that the screw 63 be seated. The load torque may be measured by, for example, a torque sensor including either a resistive strain sensor or a magnetostrictive strain sensor. Still alternatively, when the current measured value iq1 of the torque current enters a predetermined range, a decision may be made that the screw 63 be seated.

(8) Stabilization Control

Next, an exemplary operation in a situation where the stabilization control for reducing the unstable behavior (maximum retreat) of the hammer 42 is performed will be described with reference to FIG. 11. In the foregoing description, the command value generator 71 is supposed to generate the command value col of the angular velocity of the motor 3. In the following description, the command value generator 71 is supposed to generate a command value of the rotational velocity of the motor 3.

At a point in time t8, the worker operates the operating member 23 to make the motor 3 start running. At the point in time when the motor 3 starts running, the impact mechanism 40 is not performing the impact operation. At this time, the upper limit value of the rotational velocity of the motor 3 is set at the first setting Th6.

At a point in time t9, the impact mechanism 40 starts performing the impact operation, which is detected by the impact detector 78. Also, in this example, suppose the angular lead (rotational angle α1) is equal to or less than the second threshold value Th2 (corresponding to a situation where the answer is YES in Step ST7 shown in FIG. 10) and the control mode of the control unit 7 turns into the second control mode. That is to say, the control unit 7 performs the stabilization control in the second control mode.

As described above, even if the impact detector 78 has detected the impact operation but the control mode of the control unit 7 is the second control mode, the control unit 7 maintains the upper limit value of the rotational velocity of the output shaft 61. This reduces the increase in the rotational velocity of the output shaft 61, thus reducing the chances of causing the maximum retreat.

At a point in time t10, the rotational velocity of the motor 3 reaches the upper limit value of the rotational velocity of the motor 3. That is to say, the rotational velocity of the output shaft 61 reaches the upper limit value of the rotational velocity of the output shaft 61.

Thereafter, at a point in time t11, the current measured value id1 of the excitation current becomes less than the fourth threshold value Th4. Then, the control unit 7 (command value generator 71) reduces the rotational velocity of the motor 3. More specifically, the control unit 7 (command value generator 71) decreases the upper limit value of the rotational velocity of the motor 3. Then, if the operating member 23 has been pulled sufficiently deeply to say the least, the rotational velocity of the motor 3 decreases (refer to a point in time t12). This causes a decrease in the rotational velocity of the output shaft 61.

Figure 11:
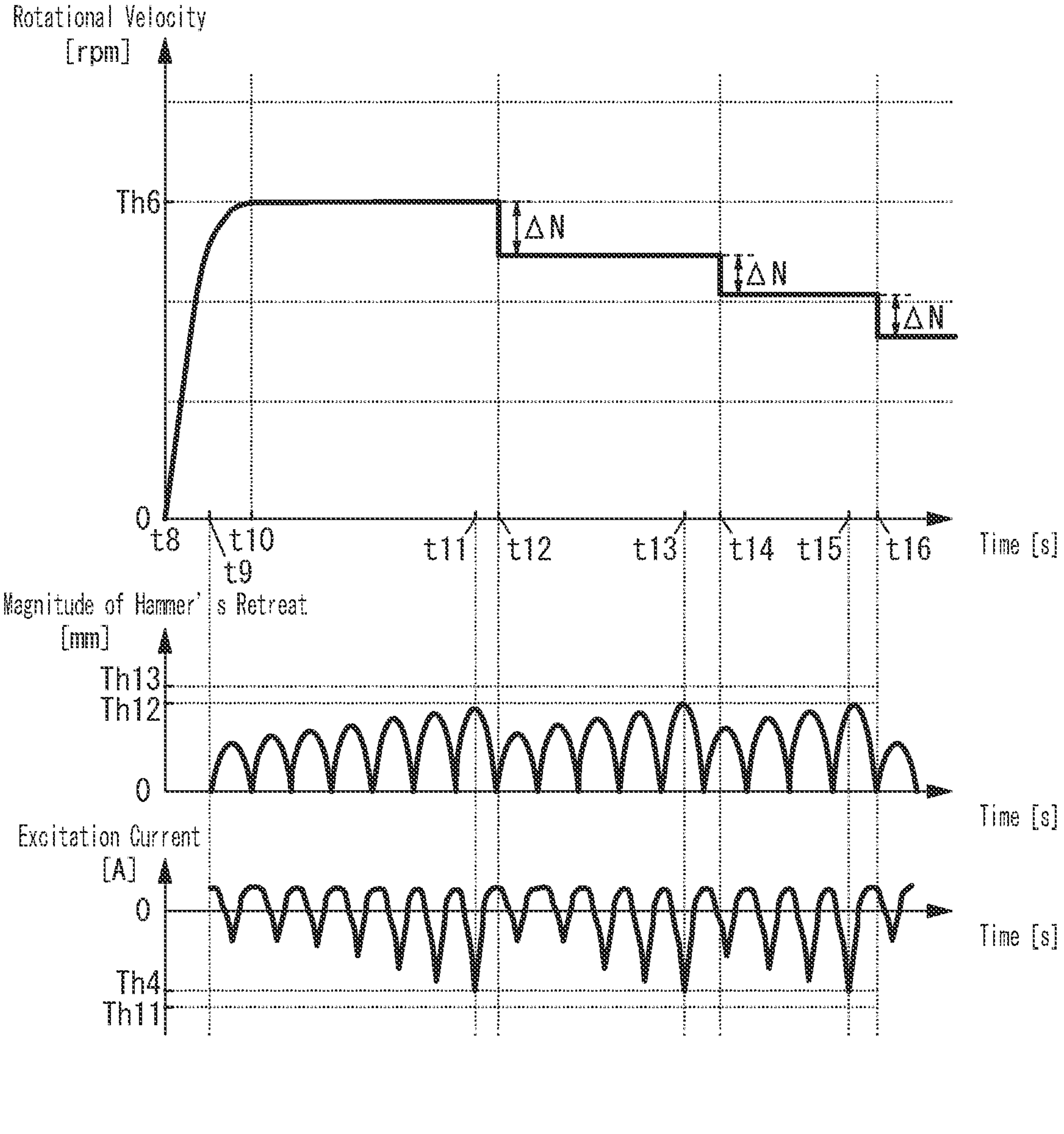
FIG. 11 is a graph showing an exemplary operation of the impact tool.

For example, every time the current measured value id1 becomes less than the fourth threshold value Th4, the control unit 7 decreases the upper limit value of the rotational velocity of the motor 3 as shown in FIG. 11. In FIG. 11, the current measured value id1 becomes less than the fourth threshold value Th4 at points in time t11, t13, and t15. Every time the current measured value id1 becomes less than the fourth threshold value Th4, the control unit 7 decreases the upper limit value of the rotational velocity of the motor 3 to a predetermined degree ΔN (refer to points in time t12, t14, and t16). The rotational velocity decreases more steeply in FIG. 11 than in FIG. 7. However, this is only an example and should not be construed as limiting. Alternatively, the rotational velocity may decrease more gently in FIG. 11 than in FIG. 7.

As another example, once the current measured value id1 has become less than the fourth threshold value Th4, the control unit 7 may decrease the upper limit value of the rotational velocity of the motor 3 gradually since then. Alternatively, the control unit 7 may stop running the motor 3 and thereby stop rotating the output shaft 61.

The greater the magnitude of retreat of the hammer 42 is, the heavier the load applied to the motor 3 is. This causes a decrease in the current measured value id1 in the negative direction. That is to say, as shown in FIG. 11, if the current measured value id1 is a negative value, the greater the absolute value of the current measured value id1 is, the greater the magnitude of retreat of the hammer 42 is. As used herein, the "magnitude of retreat of the hammer 42" refers to the magnitude of backward movement of the hammer 42 from a predetermined reference position within the movable range thereof. The magnitude of retreat of the hammer 42 when the current measured value id1 is equal to the fourth threshold value Th4 corresponds to a threshold value Th12. When the current measured value id1 becomes less than the fourth threshold value Th4, the rotational velocity of the output shaft 61 (motor 3) is reduced. This may reduce the chances of the magnitude of retreat of the hammer 42 reaching a threshold value Th13 (where Th13>Th12).

When the magnitude of retreat of the hammer 42 is equal to the threshold value Th13, the hammer 42 has retreated to the maximum degree. According to the stabilization control, the rotational velocity of the output shaft 61 is reduced depending on the current measured value id1, thereby reducing the chances of causing the maximum retreat of the hammer 42.

As can be seen, the stabilization control may reduce the chances that the hammer 42 behaves to go away by a predetermined distance or more from the anvil 45 (hereinafter referred to as a "retreat behavior"). According to this embodiment, the stabilization control reduces the chances of causing the maximum retreat, which is a type of retreat behavior. That is to say, the stabilization control is a control including at least one of reducing the rotational velocity of the output shaft 61 or stopping rotation of the output shaft 61 to reduce the chances of causing the maximum retreat of the hammer 42.

Also, the current measured value id1 in a situation where the magnitude of retreat of the hammer 42 is equal to the threshold value Th13 corresponds to a threshold value Th11. That is to say, the occurrence of the maximum retreat (retreat behavior) means that the excitation current becomes equal to or less than an excitation current threshold value (threshold value Th11). The stabilization control is a control including at least one of reducing the rotational velocity of the output shaft 61 or stopping rotation of the output shaft 61 to reduce the chances of the excitation current (current measured value id1) measured by the current measuring unit 82 becoming equal to or less than the excitation current threshold value (threshold value Th11).

(9) Advantages

As described above, in the impact tool 1, when the angular lead is relatively large (i.e., when the degree of tightness is relatively low), the control unit 7 performs the come-out reduction control in the first control mode and reduces the rotational velocity of the output shaft 61 according to the magnitude of the thrusting force F1. This enables reducing the chances of causing the come-out phenomenon.

On the other hand, when the angular lead (rotational angle α1) is relatively small (i.e., when the degree of tightness is relatively high), the control unit 7 performs the stabilization control in the second mode and controls the rotational velocity of the output shaft 61 according to the magnitude of the excitation current. This enables reducing the chances of causing the maximum retreat.

Consequently, this embodiment enables stabilizing the work of fastening screws, for example, using the impact tool 1.

(10) Method for Controlling Impact Tool and Program

The functions of some constituent elements engaged in the control of the impact tool 1, such as the control unit 7, the angular lead measurer 9A, and the thrusting force detector 9B, may also be implemented as a method for controlling the impact tool 1, a (computer) program, or a non-transitory storage medium that stores the program thereon, for example.

A method for controlling an impact tool 1 according to an aspect includes a control step and an angular lead measuring step. The control step includes controlling the rotational velocity of the output shaft 61. The angular lead measuring step includes measuring an angular lead in rotation of the anvil 45 over the hammer 42. The control step including changing, according to the angular lead measured in the angular lead measuring step, a control mode for controlling the rotational velocity of the output shaft 61 from one of a plurality of modes to another.

A method for controlling an impact tool 1 according to another aspect includes a control step and a thrusting force detecting step. The control step includes controlling the rotational velocity of the output shaft 61. The thrusting force detecting step includes detecting the thrusting force F1 applied to the output shaft 61. The thrusting force F1 is force applied in a direction aligned with a thrusting direction defined for the output shaft 61. The control step includes performing restriction processing when a thrusting force condition is satisfied. The thrusting force condition is a condition on the thrusting force F1 that has been detected in the thrusting force detecting step. The restriction processing includes at least one of reducing the rotational velocity of the output shaft 61 or stopping rotation of the output shaft 61.

A method for controlling an impact tool 1 according to still another aspect includes a control step. The control step includes performing a come-out reduction control when a first predetermined condition is satisfied and performing a stabilization control when a second predetermined condition is satisfied. The come-out reduction control is a control for reducing the chances of causing a come-out phenomenon. The come-out phenomenon refers to unintentional disengagement between a tip tool 62 coupled to the output shaft 61 and a screw 63 as a work target for the tip tool 62 while the motor 3 is running. The stabilization control is a control for reducing an unstable behavior of the hammer 42.

A program according to yet another aspect is designed to cause one or more processors to perform any of the control methods described above.

(First Variation)

Next, an impact tool 1 according to a first variation will be described. In the following description, any constituent element of this first variation, having the same function as a counterpart of the embodiment described above, will be designated by the same reference numeral as that counterpart's, and description thereof will be omitted herein.

In this variation, the control unit 7 changes, based on an angular lead in the interval during which the hammer 42 strikes the anvil 45 a predefined number of times (which may be twice or more), the control mode to perform at least one of the stabilization control or the come-out reduction control. That is to say, at least one of the first condition for starting performing the stabilization control or the second condition for starting performing the come-out reduction control is a condition on the angular lead in the interval during which the hammer 42 strikes the anvil 45 a predefined number of times (which may be twice or more). Adopting such a configuration enables reducing the chances of the control mode being changed due to an instantaneous variation in angular lead, thus allowing the operation of the impact tool 1 to be stabilized.

Alternatively, the first condition may also be, for example, a condition that the angular lead (rotational angle α1) in the interval during which the hammer 42 strikes the anvil 45 a predefined number of times be greater than the first threshold value Th1 every time the hammer 42 applies the impacting force to the anvil 45. Still alternatively, the first condition may also be, for example, that the sum of the angular leads (rotational angles α1) in the interval during which the hammer 42 strikes the anvil 45 a predefined number of times be greater than a predetermined threshold value.

Alternatively, the second condition may also be, for example, a condition that the angular lead (rotational angle α1) in the interval during which the hammer 42 strikes the anvil 45 a predefined number of times be equal to or less than the second threshold value Th2 every time the hammer 42 applies the impacting force to the anvil 45. Still alternatively, the second condition may also be, for example, that the sum of the angular leads (rotational angles α1) in the interval during which the hammer 42 strikes the anvil 45 a predefined number of times be equal to or less than a predetermined threshold value.

Other Variations of Exemplary Embodiment

Next, other variations of the exemplary embodiment will be enumerated one after another. Note that the variations to be described below may be adopted in combination as appropriate. Alternatively, the variations to be described below may also be adopted as appropriate in combination with the first variation described above.

The impact interval measurer 91 may measure the impact interval based on a voltage measured by the voltage measuring unit 83. That is to say, the impact interval measurer 91 may measure the impact interval based on a variation in voltage caused by collision between the hammer 42 and the anvil 45.

In the exemplary embodiment described above, the control unit 7 changes, based on the magnitude of the angular lead, the upper limit value of the rotational velocity of the output shaft 61 from one of the plurality of values (namely, the first setting Th6 and the second setting Th7) to another. However, this is only an example and should not be construed as limiting. Alternatively, the control unit 7 may also change the upper limit value continuously as the magnitude of the angular lead varies.

The angular lead measurer 9A does not have to measure, as the angular lead, the rotational angle α1 of the anvil 45 with respect to the hammer 42. Alternatively, the angular lead measurer 9A may also measure, as the angular lead, the distance traveled by the anvil 45 with respect to the hammer 42.

The control unit 7 may stop rotating the output shaft 61 by cutting off the transmission of the rotational force from the motor 3 to the output shaft 61. For example, if the transmission mechanism 4 includes a clutch mechanism, then the clutch mechanism may cut off the transmission of the rotational force from the motor 3 to the output shaft 61. The clutch mechanism may be implemented as an electronic clutch, for example.

In the exemplary embodiment described above, the impact detector 78 detects, on finding the current measured value id1 of the excitation current equal to or less than the predetermined value Th5, that the impact mechanism 40 is performing an impact operation. Alternatively, the impact detector 78 may also detect, on finding the absolute value of the AC component of the current measured value id1 of the excitation current greater than a threshold value, that the impact mechanism 40 is performing an impact operation.

The impact detector 78 may also detect, on finding that the current measured value id1 has become equal to or less than the predetermined value Th5 a predefined number of times or more, that the impact mechanism 40 is performing an impact operation.

The impact detector 78 may detect the impact operation based on the current measured value iq1 of the torque current. That is to say, during the impact operation, the load torque of the output shaft 61 varies more significantly, thus causing the current measured value iq1 to vary more significantly as well as shown in FIG. 7. The impact detector 78 may detect the impact operation by sensing this variation. The impact detector 78 may detect, on finding the current measured value iq1 greater than a threshold value, that the impact mechanism 40 is performing the impact operation. Alternatively, the impact detector 78 may also detect, on finding the absolute value of the AC component of the current measured value iq1 greater than a threshold value, that the impact mechanism 40 is performing the impact operation.

The impact detector 78 may also determine, based on either the command value cid1 of the excitation current or the command value ciq1 of the torque current, whether or not any impact operation is being performed.

The impact detector 78 may be provided separately from the control unit 7. That is to say, a constituent element performing the function of the control unit 7 for controlling the rotation of the motor 3 and a constituent element performing the function of the impact detector 78 for determining whether or not the impact mechanism 40 is performing any impact operation may be provided separately from each other.

In the exemplary embodiment described above, the second threshold value Th2 may be equal to the first threshold value Th1, for example. However, this is only an example and should not be construed as limiting. Alternatively, the second threshold value Th2 may be greater than, or less than, the first threshold value Th1, whichever is appropriate. In this case, the control unit 7 changes, when finding the angular lead greater than the first threshold value Th1, the control mode into the first control mode and performs the come-out reduction control. Also, the control unit 7 changes, when finding the angular lead equal to or less than the second threshold value Th2, the control mode into the second control mode and performs the stabilization control. Optionally, when finding the angular lead greater than the first threshold value Th1 and equal to or less than the second threshold value Th2, the control unit 7 may perform both the control in the first control mode and the control in the second control mode.

Even if the angular lead is greater than the first threshold value Th1, the control mode of the control unit 7 does not have to be the first control mode. For example, a fifth threshold value greater than the first threshold value Th1 may be set in advance. If the angular lead is greater than the first threshold value Th1 and equal to or less than the fifth threshold value, then the control mode may be the first control mode. On the other hand, if the angular lead is greater than the fifth threshold value, then the control mode may be another mode (such as a normal mode).

Even if the angular lead is equal to or less than the second threshold value Th2, the control mode of the control unit 7 does not have to be the second control mode. For example, a sixth threshold value less than the second threshold value Th2 may be set in advance. If the angular lead is equal to or less than the second threshold value Th2 and greater than the sixth threshold value, then the control mode may be the second control mode. On the other hand, if the angular lead is equal to or less than the sixth threshold value, then the control mode may be another mode (such as the normal mode).

The thrusting force detector 9B is not always configured to detect the thrusting force F1 based on the impact interval and the rotational velocity of the hammer 42. Alternatively, the thrusting force detector 9B may also detect the thrusting force F1 using a sensor. The sensor may be, for example, a pressure sensor such as a stain gauge attached to the output shaft 61.

The thrusting force threshold value (third threshold value) may vary according to the rotational velocity of the motor 3.

The thrusting force condition may be a condition that the thrusting force F1 be a value falling within a certain range.

Optionally, the control mode of the control unit 7 may be fixed while the impact mechanism 40 is performing the impact operation. For example, once the control mode turns into either the first control mode or the second control mode after the impact mechanism 40 has started performing the impact operation, the control mode may be fixed until the impact operation is finished.

The control mode of the control unit 7 may be changed as needed as the angular lead (rotational angle α1) varies while the impact mechanism 40 is performing the impact operation.

The unstable behavior of the hammer 42 to be reduced by the stabilization control does not have to be the maximum retreat. Alternatively, the unstable behavior may also be, for example, a state where the contact point between the hammer 42 and the anvil 45 that collide against each other falls outside of a predetermined range.

Still alternatively, the unstable behavior may also be, for example, a state where a projection 425 of the hammer 42 collides against a claw 455 of the anvil 45 multiple times while the projection 425 is going over the claw 455 once.

Yet alternatively, the unstable behavior may also be, for example, the occurrence of an "upward slide" operation. The "upward slide" operation herein refers to a mode of operation in which the projections 425 of the hammer 42 collide against one of the two claws 455 of the anvil 45 and then move to slide along the side surface 4550 of the claw 455 (i.e., while keeping in contact with the side surface 4550) and thereby go over the claw 455.

Yet alternatively, the unstable behavior may also be, for example, a state where the hammer 42 advances to reach a front end of its movable range.

Yet alternatively, the unstable behavior may also be, for example, a state where the front surface of the projection 425 of the hammer 42 is in contact with the rear surface of the claw 455 of the anvil 45.

Optionally, the output shaft 61 may be formed integrally with the tip tool 62.

The tip tool 62 does not have to be a screwdriver bit. Alternatively, the tip tool 62 may also be a bit for using the impact tool 1 as, for example, an electric drill, fraise, grinder, cleaner, jigsaw, or hole saw.

The control unit 7 does not have to perform the vector control. Alternatively, any other scheme may also be adopted as a scheme for controlling the motor 3.

In the motor 3 that is a synchronous motor, as the polarity of the motor 3 changes, the voltage between the windings of the motor 3 changes periodically, thus causing the motor 3 to rotate. The voltage measuring unit 83 measures the voltage applied to the motor 3 (i.e., the voltage between its windings). The estimator 77 may measure, based on the voltage measured by the voltage measuring unit 83, the angular velocity ω1 of the motor 3.

Optionally, the various types of threshold values for use in the impact tool 1 may be changeable in accordance with the worker's operating command, for example.

Furthermore, in the present disclosure, if one of two values being compared with each other is "equal to or greater than" the other, this phrase may herein cover both a situation where these two values are equal to each other and a situation where one of the two values is greater than the other. However, this should not be construed as limiting. Alternatively, the phrase "equal to or greater than" may also be a synonym of the phrase "greater than" that covers only a situation where one of the two values is over the other. That is to say, it is arbitrarily changeable, depending on selection of a reference value or any preset value, whether or not the phrase "equal to or greater than" covers the situation where the two values are equal to each other. Therefore, from a technical point of view, there is no difference between the phrase "equal to or greater than" and the phrase "greater than." Similarly, the phrase "less than" may be a synonym of the phrase "equal to or less than" as well.

Some constituent elements (such as the control unit 7, the angular lead measurer 9A, and the thrusting force detector 9B) of the impact tool 1 according to the present disclosure each include a computer system. The computer system may include, as principal hardware components thereof, a processor and a memory. The functions of those constituent elements of the impact tool 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Furthermore, at least some functions of the impact tool 1, which are distributed in multiple devices in the exemplary embodiment described above, may also be aggregated together in a single device. For example, the respective functions of the control unit 7, the angular lead measurer 9A, and the thrusting force detector 9B may be aggregated together in a single device.

(Recapitulation)

The embodiment and its variations described above may be specific implementations of the following aspects of the present disclosure.

An impact tool (1) according to a first aspect includes a motor (3), an impact mechanism (40), an output shaft (61), a control unit (7), and an angular lead measurer (9A). The impact mechanism (40) includes a hammer (42) and an anvil (45). The hammer (42) rotates with motive power supplied from the motor (3). The anvil (45) rotates upon receiving impacting force from the hammer (42). The output shaft (61) rotates along with the anvil (45). The control unit (7) controls a rotational velocity of the output shaft (61). The angular lead measurer (9A) measures an angular lead in rotation (rotational angle α1) of the anvil (45) over the hammer (42). The impact mechanism (40) performs an impact operation when a torque condition on magnitude of torque applied to the output shaft (61) is satisfied. The impact operation is an operation of applying the impacting force from the hammer (42) to the anvil (45). The control unit (7) changes, according to the angular lead measured by the angular lead measurer (9A), a control mode for controlling the rotational velocity of the output shaft (61) from one of a plurality of modes to another.

This configuration enables the impact tool (1) to control the rotational velocity of the output shaft (61) autonomously according to the working situation.

In an impact tool (1) according to a second aspect, which may be implemented in conjunction with the first aspect, the angular lead measurer (9A) includes an impact interval measurer (91), a hammer rotation measurer (92), and a calculator (93). The impact interval measurer (91) measures an impact interval that is a time interval at which the hammer (42) applies the impacting force to the anvil (45). The hammer rotation measurer (92) measures a rotational velocity of the hammer (42). The calculator (93) calculates the angular lead based on the impact interval measured by the impact interval measurer (91) and the rotational velocity of the hammer (42) as measured by the hammer rotation measurer (92).

This configuration enables estimating the angular lead accurately.

In an impact tool (1) according to a third aspect, which may be implemented in conjunction with the second aspect, the angular lead measurer (9A) further includes at least one of a current measuring unit (82) or a voltage measuring unit (83). The current measuring unit (82) measures an electric current flowing through the motor (3). The voltage measuring unit (83) measures a voltage applied to the motor (3). The impact interval measurer (91) measures the impact interval based on either the electric current measured by the current measuring unit (82) or the voltage measured by the voltage measuring unit (83).

This configuration enables estimating the impact interval accurately.

In an impact tool (1) according to a fourth aspect, which may be implemented in conjunction with the third aspect, the angular lead measurer (9A) includes the current measuring unit (82). The impact interval measurer (91) measures, as the impact interval, a time interval at which an excitation current measured by the current measuring unit (82) becomes equal to or less than a predetermined value (Th5).

This configuration enables estimating the impact interval accurately.

In an impact tool (1) according to a fifth aspect, which may be implemented in conjunction with any one of the first to fourth aspects, the plurality of modes includes a first control mode. The control unit (7) changes, when finding the angular lead greater than a first threshold value (Th1), the control mode into the first control mode.

This configuration enables changing the control mode into the first control mode in an appropriate situation.

In an impact tool (1) according to a sixth aspect, which may be implemented in conjunction with any one of the first to fifth aspects, the plurality of modes includes a second control mode. The control unit (7) changes, when finding the angular lead equal to or less than a second threshold value (Th2), the control mode into the second control mode.

This configuration enables changing the control mode into the second control mode in an appropriate situation.

In an impact tool (1) according to a seventh aspect, which may be implemented in conjunction with any one of the first to sixth aspects, the plurality of modes includes: a normal mode in which the output shaft (61) is allowed to rotate: and a velocity reduction mode in which restriction processing is performed depending on a condition. The restriction processing includes at least one of reducing the rotational velocity of the output shaft (61) to a lower velocity than in the normal mode or stopping rotation of the output shaft (61).

This configuration enables stabilizing the operation of the impact tool (1).

In an impact tool (1) according to an eighth aspect, which may be implemented in conjunction with any one of the first to seventh aspects, the control unit (7) controls the rotational velocity of the output shaft (61) to an upper limit value or less. The control unit (7) increases the upper limit value as the angular lead increases.

This configuration enables stabilizing the operation of the impact tool (1).

An impact tool (1) according to a ninth aspect, which may be implemented in conjunction with any one of the first to eighth aspects, further includes an impact detector (78). The impact detector (78) detects the impact operation performed by the impact mechanism (40). The control unit (7) changes the control mode based on the angular lead throughout a period from a point in time when the impact detector (78) has detected the impact operation through a point in time when the motor (3) stops running.

This configuration enables changing the control mode at an appropriate timing.

Note that the constituent elements according to the second to ninth aspects are not essential constituent elements for the impact tool (1) but may be omitted as appropriate.

A control method for controlling an impact tool (1) according to a tenth aspect is a method for controlling an impact tool (1) including a motor (3), an impact mechanism (40), and an output shaft (61). The impact mechanism (40) includes a hammer (42) and an anvil (45). The hammer (42) rotates with motive power supplied from the motor (3). The anvil (45) rotates upon receiving impacting force from the hammer (42). The output shaft (61) rotates along with the anvil (45). The control method includes a control step and an angular lead measuring step. The control step includes controlling a rotational velocity of the output shaft (61). The angular lead measuring step includes measuring an angular lead in rotation of the anvil (45) over the hammer (42). The impact mechanism (40) performs an impact operation when a torque condition on magnitude of torque applied to the output shaft (61) is satisfied. The impact operation is an operation of applying the impacting force from the hammer (42) to the anvil (45). The control step includes changing, according to the angular lead measured in the angular lead measuring step, a control mode for controlling the rotational velocity of the output shaft (61) from one of a plurality of modes to another.

This control method enables the impact tool (1) to control the rotational velocity of the output shaft (61) autonomously according to the working situation.

A program according to an eleventh aspect is designed to cause one or more processors to perform the control method for controlling the impact tool (1) according to the tenth aspect.

This program enables the impact tool (1) to control the rotational velocity of the output shaft (61) autonomously according to the working situation.

Note that these are not the only aspects of the present disclosure. Rather, various configurations (including variations) of the impact tool (1) according to the exemplary embodiment described above may also be implemented as a control method for controlling the impact tool (1) or a program.

REFERENCE SIGNS LIST

1 Impact Tool
3 Motor
7 Control Unit
9A Angular Lead Measuring Unit
40 Impact Mechanism
42 Hammer
45 Anvil
78 Impact Detector
61 Output Shaft
82 Current Measuring Unit
83 Voltage Measuring Unit
91 Impact Interval Measurer
92 Hammer Rotation Measurer
93 Calculator
Th1 First Threshold Value
Th2 Second Threshold Value
Th5 Predetermined Value
α1 Rotational Angle

The invention claimed is:

1. An impact tool comprising:
a motor;
an impact mechanism including a hammer and an anvil, the hammer being configured to rotate with motive power supplied from the motor, the anvil being configured to rotate upon receiving impacting force from the hammer;
an output shaft configured to rotate along with the anvil;
a control unit configured to control a rotational velocity of the output shaft; and
an angular lead measurer configured to measure an angular lead in rotation of the anvil over the hammer,
the impact mechanism being configured to, when a torque condition on magnitude of torque applied to the output shaft is satisfied, perform an impact operation of applying the impacting force from the hammer to the anvil,
the control unit being configured to change, according to the angular lead measured by the angular lead measurer, a control mode for controlling the rotational velocity of the output shaft from one of a plurality of modes to another.

2. The impact tool of claim 1, wherein
the angular lead measurer comprises:
an impact interval measurer configured to measure an impact interval that is a time interval at which the hammer applies the impacting force to the anvil;
a hammer rotation measurer configured to measure a rotational velocity of the hammer; and
a calculator configured to calculate the angular lead based on the impact interval measured by the impact interval measurer and the rotational velocity of the hammer as measured by the hammer rotation measurer.

3. The impact tool of claim 2, wherein
the angular lead measurer further includes at least one of:
a current measuring unit configured to measure an electric current flowing through the motor; or
a voltage measuring unit configured to measure a voltage applied to the motor, and
the impact interval measurer is configured to measure the impact interval based on either the electric current measured by the current measuring unit or the voltage measured by the voltage measuring unit.

4. The impact tool of claim 3, wherein
the angular lead measurer includes the current measuring unit, and
the impact interval measurer is configured to measure, as the impact interval, a time interval at which an excitation current measured by the current measuring unit becomes equal to or less than a predetermined value.

5. The impact tool of claim 1, wherein
the plurality of modes includes a first control mode, and
the control unit is configured to, when finding the angular lead greater than a first threshold value, change the control mode into the first control mode.

6. The impact tool of claim 1, wherein
the plurality of modes includes a second control mode, and
the control unit is configured to, when finding the angular lead equal to or less than a second threshold value, change the control mode into the second control mode.

7. The impact tool of claim 1, wherein
the plurality of modes includes: a normal mode in which the output shaft is allowed to rotate; and a velocity reduction mode in which restriction processing is performed depending on a condition, and
the restriction processing includes at least one of reducing the rotational velocity of the output shaft to a lower velocity than in the normal mode or stopping rotation of the output shaft.

8. The impact tool of claim 1, wherein
the control unit is configured to control the rotational velocity of the output shaft to an upper limit value or less, and
the control unit is configured to increase the upper limit value as the angular lead increases.

9. The impact tool of claim 1, further comprising an impact detector configured to detect the impact operation performed by the impact mechanism, wherein
the control unit is configured to change the control mode based on the angular lead throughout a period from a point in time when the impact detector has detected the impact operation through a point in time when the motor stops running.

10. A control method for controlling an impact tool, the impact tool including:
a motor;
an impact mechanism including a hammer and an anvil, the hammer being configured to rotate with motive power supplied from the motor, the anvil being configured to rotate upon receiving impacting force from the hammer; and
an output shaft configured to rotate along with the anvil,
the control method comprising:
a control step including controlling a rotational velocity of the output shaft; and
an angular lead measuring step including measuring an angular lead in rotation of the anvil over the hammer,
the impact mechanism being configured to, when a torque condition on magnitude of torque applied to the output shaft is satisfied, perform an impact operation of applying the impacting force from the hammer to the anvil, the control step including changing, according to the angular lead measured in the angular lead measuring step, a control mode for controlling the rotational velocity of the output shaft from one of a plurality of modes to another.

11. A non-transitory storage medium readable for a computer system and storing a program designed to cause one or more processors of the computer system to perform the control method of claim 10.

* * * * *